United States Patent
Murakami et al.

(10) Patent No.: US 12,374,490 B2
(45) Date of Patent: Jul. 29, 2025

(54) MULTILAYER ELECTRONIC DEVICE

(71) Applicant: TDK CORPORATION, Tokyo (JP)

(72) Inventors: Taku Murakami, Tokyo (JP); Nobuto Morigasaki, Tokyo (JP); Takuma Ariizumi, Tokyo (JP); Yoshitaka Nagashima, Tokyo (JP); Masato Kimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 140 days.

(21) Appl. No.: 18/357,505

(22) Filed: Jul. 24, 2023

(65) Prior Publication Data
US 2024/0047136 A1 Feb. 8, 2024

(30) Foreign Application Priority Data
Aug. 4, 2022 (JP) .................................. 2022-125005

(51) Int. Cl.
*H01G 4/12* (2006.01)
*H01G 4/30* (2006.01)

(52) U.S. Cl.
CPC .............. *H01G 4/1209* (2013.01); *H01G 4/30* (2013.01)

(58) Field of Classification Search
None
See application file for complete search history.

(56) References Cited

U.S. PATENT DOCUMENTS

| 7,131,174 B2* | 11/2006 | Kobayashi | H01G 4/30 264/650 |
| 8,345,405 B2* | 1/2013 | Jeong | H01G 4/005 361/321.1 |
| 9,691,549 B2* | 6/2017 | Shiota | H01G 4/12 |
| 2003/0170432 A1* | 9/2003 | Kobayashi | H01G 4/30 428/209 |
| 2011/0141655 A1* | 6/2011 | Jeong | H01G 4/005 361/306.3 |

(Continued)

FOREIGN PATENT DOCUMENTS

| CA | 2207847 C | * | 8/2000 | H01G 4/12 |
| JP | 5496331 B2 | * | 5/2014 | C01G 23/006 |

(Continued)

OTHER PUBLICATIONS

Machine Translation of JP '331 (Year: 2014).*

*Primary Examiner* — Dion R. Ferguson
(74) *Attorney, Agent, or Firm* — Oliff PLC

(57) ABSTRACT

A multilayer electronic device includes an element body and a pair of external electrodes. The element body includes an interior region in which inner dielectric layers and internal electrode layers are alternately laminated and an exterior region located outside the interior region in its lamination direction. The pair of external electrodes exists on surfaces of the element body. Main-phase particles in the inner dielectric layers and outer dielectric layers of the exterior region include a main component having a perovskite crystal structure represented by a general formula of $ABO_3$. $r1 < r2 < r1 \times 4.0$ is satisfied, in which r1 is an average particle size of the main-phase particles constituting the inner dielectric layers, and r2 is an average particle size of the main-phase particles constituting the outer dielectric layers.

8 Claims, 6 Drawing Sheets

(56) References Cited

U.S. PATENT DOCUMENTS

| | | | | |
|---|---|---|---|---|
| 2013/0321978 A1* | 12/2013 | Lee | .................... | H01G 4/1227 |
| | | | | 361/301.4 |
| 2014/0043722 A1* | 2/2014 | Hirata | .................... | H01G 4/30 |
| | | | | 361/301.4 |
| 2015/0187497 A1* | 7/2015 | Saito | .................... | H01G 4/1227 |
| | | | | 361/301.4 |
| 2015/0274597 A1* | 10/2015 | Morigasaki | ........... | C04B 35/638 |
| | | | | 428/697 |
| 2016/0293333 A1* | 10/2016 | Kaneko | .................... | H01G 4/12 |
| 2019/0237263 A1* | 8/2019 | Kaneda | .................. | H05K 1/181 |
| 2021/0104365 A1* | 4/2021 | Kaneda | .................. | H01G 4/008 |
| 2023/0101251 A1* | 3/2023 | Mori | .................... | H01G 4/1218 |
| | | | | 361/301.4 |
| 2024/0047136 A1* | 2/2024 | Murakami | ............... | H01G 4/30 |

FOREIGN PATENT DOCUMENTS

| | | | | | |
|---|---|---|---|---|---|
| JP | 2016195144 A | * | 11/2016 | ............... | H01G 4/12 |
| JP | 6879334 B2 | * | 6/2021 | ............... | H01G 4/12 |
| KR | 20110065623 A | * | 6/2011 | | |
| KR | 101771728 B1 | * | 8/2017 | | |
| TW | 1746867 B | * | 11/2021 | | |

\* cited by examiner

MULTILAYER ELECTRONIC DEVICE

The present application claims a priority based on Japanese Patent Application No. 2022-125005 filed on Aug. 4, 2022 and incorporates it into the present specification by reference to that disclosure in its entirety.

BACKGROUND OF THE INVENTION

The present invention relates to a multilayer electronic device.

Patent Document 1 (Japanese Patent No. 6879334) discloses that, in a multilayer ceramic electronic device, the relative permittivity is improved by changing the particle sizes between first dielectric particles located in an interior region and second dielectric particles located in exterior regions.

On the other hand, the market is now demanding that cracking be restrained, and that reliability be improved with favorable temperature characteristics.

BRIEF SUMMARY OF THE INVENTION

The present invention has been achieved under such circumstances. It is an object of the invention to provide a multilayer electronic device capable of both restraining the occurrence of cracking and improving the reliability with favorable temperature characteristics.

To achieve the above object, a multilayer electronic device according to the present invention comprises:
an element body including:
  an interior region in which inner dielectric layers and internal electrode layers are alternately laminated; and
  an exterior region located outside the interior region in its lamination direction; and
a pair of external electrodes existing on surfaces of the element body to connect with the internal electrode layers
wherein
main-phase particles in the inner dielectric layers and outer dielectric layers of the exterior region include a main component having a perovskite crystal structure represented by a general formula of $ABO_3$, in which
  A is at least one selected from Ba, Sr, and Ca, and
  B is at least one selected from Ti, Zr, and Hf,
the inner dielectric layers and the outer dielectric layers include subcomponents containing RE, M, and Si, in which
  RE is at least one selected from Yb, Y, Ho, Dy, Tb, Gd, and Eu, and
  M is at least two selected from Mg, Mn, V, and Cr,
an RE content $C_{RE}$ in terms of $RE_2O_3$ is 0.90 parts by mol or more and 3.60 parts by mol or less with respect to 100 parts by mol of the main component in the inner dielectric layers and the outer dielectric layers,
an M content $C_M$ in terms of MO is 0.20 parts by mol or more and 1.20 parts by mol or less with respect to 100 parts by mol of the main component in the inner dielectric layers and the outer dielectric layers,
a Si content $C_{Si}$ in terms of $SiO_2$ is 0.60 parts by mol or more and 1.80 parts by mol or less with respect to 100 parts by mol of the main component in the inner dielectric layers and the outer dielectric layers, and
r1 and r2 satisfy a relation of $r1<r2<r1\times4.0$, in which
  r1 is an average particle size of the main-phase particles constituting the inner dielectric layers, and
  r2 is an average particle size of the main-phase particles constituting the outer dielectric layers.

In the multilayer electronic device according to the present invention, it is possible to both restrain the occurrence of cracking and improve the reliability, and it is also possible to achieve favorable temperature characteristics.

Specifically, in the multilayer electronic device according to the present invention, the exterior region has a high hardness, namely, a high mechanical strength, and it is thus possible to prevent the occurrence of cracking due to external impact, electrostriction, or the like.

The reliability can be confirmed, for example, by measuring a high temperature load life. That is, it can be determined that the longer the high temperature load life is, the more favorable the reliability is.

Preferably, L, ra, rb, and rc satisfy relations of $(rb-ra)/L>0.00008$ and $(rc-rb)/L>0.00008$, in which
  $2\times L$ is a distance from an outer surface of an outermost layer of the internal electrode layers to an outer surface of the element body,
  ra is an average particle size of the main-phase particles in the exterior region near the internal electrode layers,
  rb is an average particle size of the main-phase particles in the exterior region at an intermediate point between the outer surface of the outermost layer of the internal electrode layers and the outer surface of the element body, and
  rc is an average particle size of the main-phase particles in the exterior region near the outer surface of the element body.

In this case, the exterior region has a higher hardness.

Preferably, SNR, SNRa, SNRb, and SNRc satisfy relations of $SNR>SNRa$, $SNR>SNRb$, and $SNR>SNRc$, in which
  SNR is a SN ratio of particle sizes of the main-phase particles constituting the inner dielectric layers,
  SNRa is a SN ratio of particle sizes of the main-phase particles in the exterior region near the internal electrode layers,
  SNRb is a SN ratio of particle sizes of the main-phase particles in the exterior region at an intermediate point between an outer surface of an outermost layer of the internal electrode layers and an outer surface of the element body, and
  SNRc is a SN ratio of particle sizes of the main-phase particles in the exterior region near the outer surface of the element body.

In this case, the high temperature load life is more favorable. The larger the SN ratio is, the smaller the variation is. Thus, when SNR, SNRa, SNRb, and SNRc satisfy $SNR>SNRa$, $SNR>SNRb$, and $SNR>SNRc$, the variation in the particle sizes of the main-phase particles constituting the inner dielectric layers is smaller than the variation in the particle sizes of the main-phase particles constituting the outer dielectric layers.

The interior region contributes to electrical characteristics. The smaller the variation in the particle sizes of the main-phase particles is, the further the high temperature load life is improved. On the other hand, the exterior region does not contribute to electrical characteristics. Thus, when the variation in the particle sizes of the main-phase particles constituting the inner dielectric layers is smaller than the variation in the particle sizes of the main-phase particles constituting the outer dielectric layers, the high temperature load life is more favorable.

Preferably, an area ratio of a solid-solution region of RE of the main-phase particles constituting the inner dielectric layers is 12% or more and 50% or less.

When an area ratio of a solid-solution region of RE (hereinafter, sometimes referred to as "RE solid-solution region") in the main-phase particles constituting the inner dielectric layers is 12% or more and 50% or less, the temperature characteristics and the high temperature load life are more favorable. When the area ratio of the RE solid-solution region is 12% or more, the resistance is higher, and as a result, the high temperature load life is more favorable. This is probably because, when the resistance is higher, the electric current density is prevented from being locally high under a high electric field, and as a result, the failure can be prevented. On the other hand, when the area ratio of the RE solid-solution region is 50% or less, the area ratio of the RE solid-solution region to the main component is not too high, and more favorable temperature characteristics can be obtained.

Preferably, at least a part of the main-phase particles constituting the inner dielectric layers has a core-shell structure including: a core portion; and a shell portion surrounding the core portion and containing RE in solid solution, the main-phase particles constituting the inner dielectric layers and having an average thickness of 5 nm or more in the shell portion are defined as specific main-phase particles, and a number ratio of the specific main-phase particles to the main-phase particles in the inner dielectric layers is 90% or more.

When the shell portion has an average thickness of 5 nm or more, the resistance is higher, and as a result, it becomes easier to prevent deterioration of the inner dielectric layers under a high electric field. Thus, when a number ratio of the specific main-phase particles to the main-phase particles in the inner dielectric layers is 90% or more, the resistance is higher, and as a result, the high temperature load life is more favorable.

Preferably, M1 is an element of M with the highest content in the inner dielectric layers and the outer dielectric layers, and a M1 content $C_{M1}$ in terms of M1O is 0.40 parts by mol or more and 0.90 parts by mol or less with respect to 100 parts by mol of the main component in the inner dielectric layers and the outer dielectric layers.

RE is solid-soluted in the main-phase particles as a donor component when the A-site element is replaced by RE, and RE and M are solid-soluted in the main-phase particles as an acceptor component when the B-site element is replaced by RE and M.

When $C_{M1}$ is 0.40 parts by mol or more and 0.90 parts by mol or less, the donor component and the acceptor component in the main-phase particles 20 can be balanced while restraining the variation in the particle sizes of the main-phase particles after sintering, and the high temperature load life is thus more favorable.

When $C_{M1}$ is within the above-mentioned range, the grain boundary component can be secured sufficiently compared to when $C_{M1}$ is below the above-mentioned range, it is thus possible to prevent abnormal grain growth and particle size variation of the main-phase particles, and as a result, the high temperature load life is further improved.

Moreover, when $C_{M1}$ is within the above-mentioned range, the ratio of the acceptor component to the donor component is not too much compared to when $C_{M1}$ is above the above-mentioned range, oxygen defects can be restrained, and the high temperature load life is thus further improved.

Preferably, a relation of 180 nm<r1<240 nm is satisfied, in which r1 is an average particle size of the main-phase particles constituting the inner dielectric layers.

When r1 is within the above-mentioned range, the high temperature load life and the temperature characteristics are more favorable compared to when r1 is above the above-mentioned range. This is probably because when r1 is within the above-mentioned range, the particle sizes do not grow too large, a large number of interlayer particles can be obtained in the interior region, and the high temperature load life is thus more favorable. Moreover, when r1 is within the above-mentioned range, it is considered that the grain growth of the raw material powder of the main component is not too promoted, namely, no abnormal grain growth of the raw material powder of the main component is promoted, and the temperature characteristics are thus more favorable.

When r1 is within the above-mentioned range, the high temperature load life and the temperature characteristics are more favorable compared to when r1 is below the above-mentioned range. This is probably because when r1 is within the above-mentioned range, the solid solution of RE, M, and/or Si into the main-phase particles is sufficiently achieved, and the shell portion is formed.

BRIEF DESCRIPTION OF THE DRAWING(S)

DETAILED DESCRIPTION OF THE INVENTION

Figure 1A:
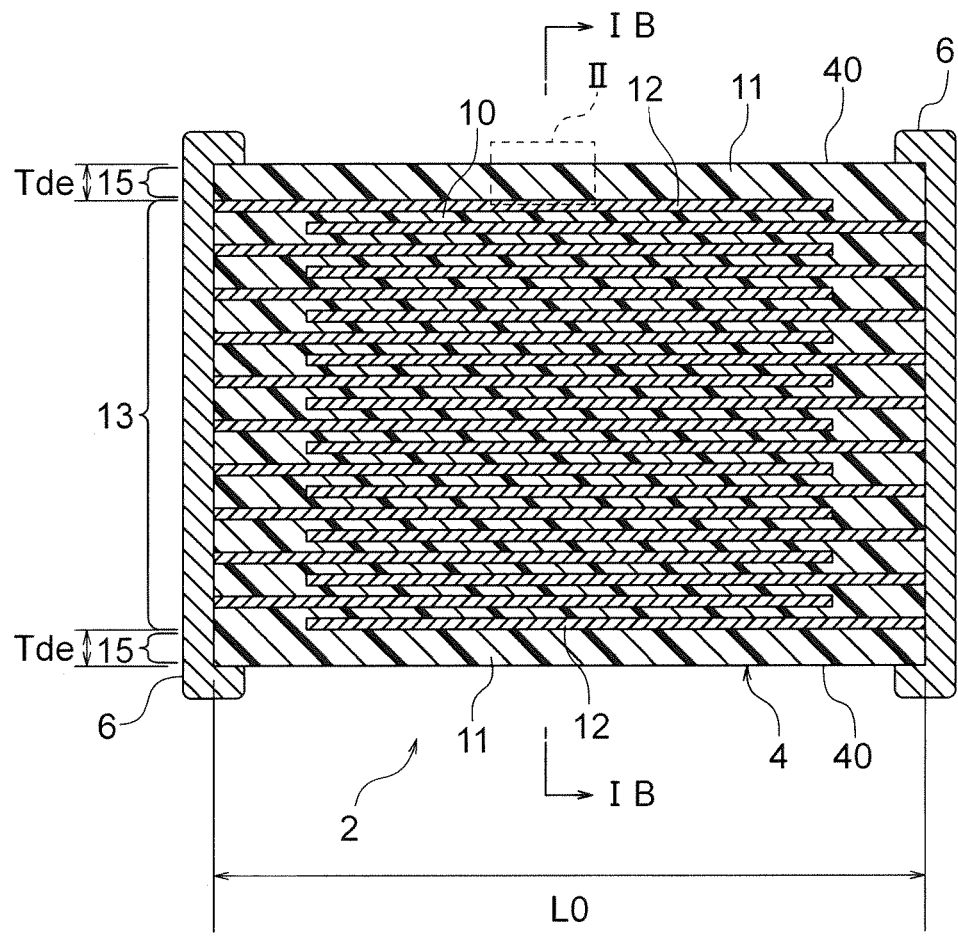
FIG. 1A is a schematic cross-sectional view of a multilayer ceramic capacitor.
Figure 1B:
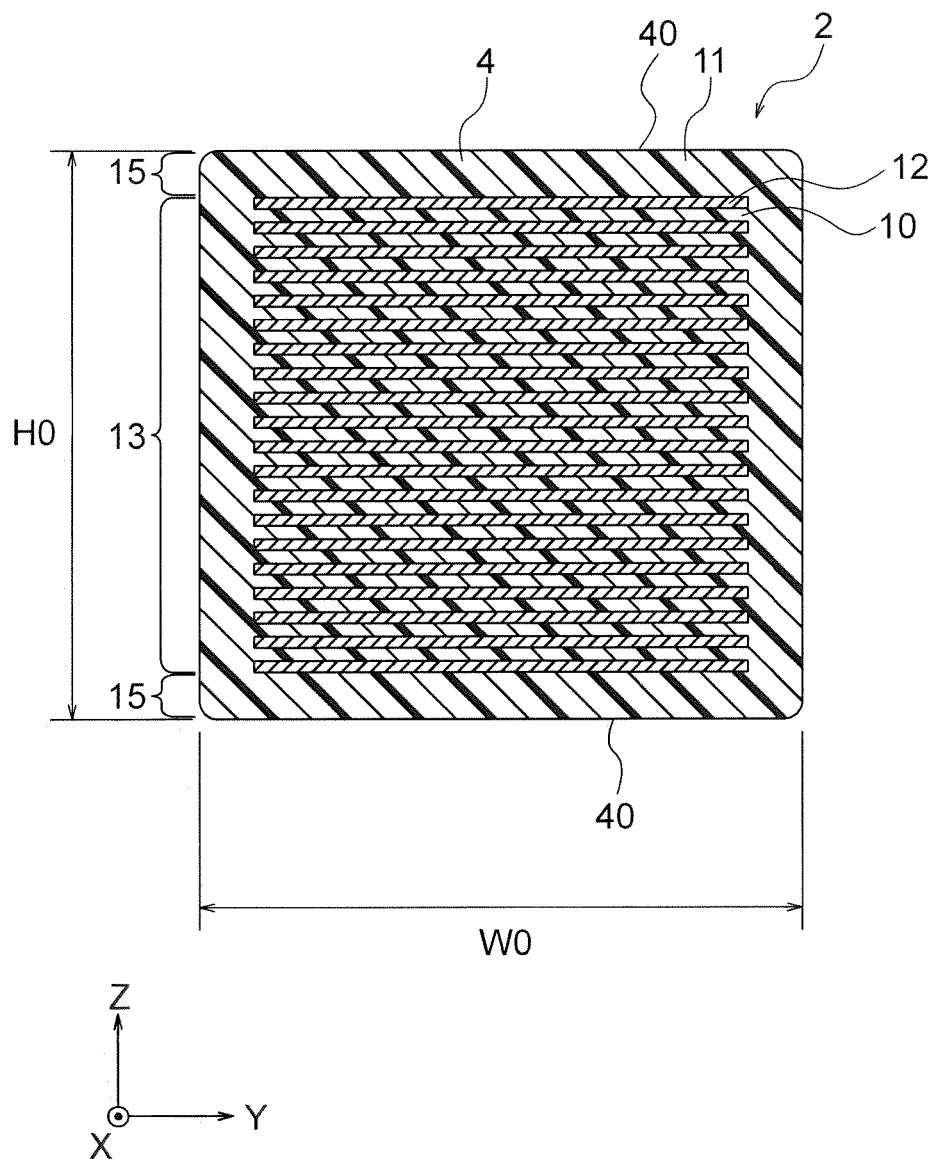
FIG. 1B is a schematic cross-sectional view of the multilayer ceramic capacitor along the line IB-IB in FIG. 1A.

1. Multilayer Ceramic Capacitor 1.1 Overall Structure of Multilayer Ceramic Capacitor A multilayer ceramic capacitor 2 as an example of a multilayer electronic device according to the present embodiment is shown in FIG. 1A and FIG. 1B. The multilayer ceramic capacitor 2 includes an element body 4, and the element body 4 includes an interior region 13 and exterior regions 15. The interior region 13 includes inner dielectric layers 10 and internal electrode layers 12 substantially parallel to a plane including the X-axis and the Y-axis and has a structure in which the inner dielectric layers 10 and the internal electrode layers 12 are alternately laminated in the Z-axis direction. The exterior regions 15 are located outside the interior region 13 in the lamination direction (Z-axis direction) of the interior region 13.

Here, the X-axis, the Y-axis, and the Z-axis are perpendicular to each other.

Also, "inner" means the side closer to the center of the multilayer ceramic capacitor 2, and "outer" means the side farther from the center of the multilayer ceramic capacitor 2.

Moreover, "substantially parallel" means that the most portion is parallel, but there may a portion that is not parallel to some extent, and the inner dielectric layers 10 and the internal electrode layers 12 may be slightly uneven or inclined.

In FIG. 1A, the end surfaces of the element body 4 in the X-axis direction are flat, in other words, the inner dielectric layers 10 and the internal electrode layers 12 are arranged so as to be flush with each other. However, the end surfaces of the element body 4 in the X-axis direction may have a non-flat portion. Moreover, the inner dielectric layers 10 and the internal electrode layers 12 may not be flush with each other, and, for example, the inner dielectric layers 10 and the internal electrode layers 12 may be laminated in a state where the inner dielectric layers 10 are partly shaved or the internal electrode layers 12 are partly protruding.

The exterior regions 15 are formed of outer dielectric layers 11. The exterior regions 15 may have a single-layer structure consisting of only one outer dielectric layer 11 or may have a multilayer structure in which a plurality of outer dielectric layers 11 is laminated.

A pair of external electrodes 6 each electrically connected to the internal electrode layers 12 alternately arranged inside the element body 4 is formed at both ends of the element body 4. The shape of the element body 4 is not limited, but is normally rectangular parallelepiped. Also, the dimensions of the element body 4 are not limited and are appropriately determined according to the application.

In the present embodiment, the element body 4 may have a vertical dimension L0 (see FIG. 1A) of 5.7 to 0.4 mm, a width dimension W0 (see FIG. 1B) of 5.0 to 0.2 mm, and a height dimension H0 (see FIG. 1B) of 5.0 to 0.2 mm.

As a specific size of the element body 4, L0×W0 is (5.7±0.4) mm×(5.0±0.4) mm, (4.5±0.4) mm×(3.2±0.4) mm, (3.2±0.3) mm×(2.5±0.2) mm, (3.2±0.3) mm×(1.6±0.2) mm, (2.0±0.2) mm×(1.2±0.1) mm, (1.6±0.2) mm×(0.8±0.1) mm, (1.0±0.1) mm×(0.5±0.05) mm, (0.6±0.06) mm×(0.3±0.03) mm, (0.4±0.04) mm×(0.2±0.02) mm, or the like. Also, H0 is not limited and is, for example, approximately equal to or less than W0.

1.2 Internal Electrode Layers

In the present embodiment, the internal electrode layers 12 are laminated so that their ends are alternately exposed to the surfaces of the two opposing end surfaces of the element body 4.

The conductive material contained in the internal electrode layers 12 is not limited. Noble metals used as the conductive material include Pd, Pt, Ag—Pd alloys, or the like. Base metals used as the conductive material include Ni, Ni based alloys, Cu, Cu based alloys, or the like. Note that, Ni, Ni based alloys, Cu, or Cu based alloys may contain various trace components such as P and/or S in an amount of about 0.1 mass % or less. The internal electrode layers 12 may be formed using a commercially available electrode paste. The thickness of each of the internal electrode layers 12 may be appropriately determined according to the application, or the like.

1.3 External Electrodes

The conductive material contained in the external electrodes 6 is not limited and is, for example, a known conductive material, such as Ni, Cu, Sn, Ag, Pd, Pt, Au, an alloy thereof, and a conductive resin. The thickness of each of the external electrodes 6 may be appropriately determined according to the application, or the like.

1.4 Dielectric Layers

In the present embodiment, the "inner dielectric layers 10" and the "outer dielectric layers 11" may be collectively referred to as "dielectric layers".

The thickness per layer (interlayer thickness) of the inner dielectric layers 10 is not limited and can be determined freely according to desired characteristics, applications, and the like. Normally, the interlayer thickness may be 20 µm or less, 10 µm or less, or 5 µm or less. Also, the lamination number of inner dielectric layers 10 is not limited and may be, for example, 10 layers or more, 100 layers or more, or 200 layers or more.

The thickness (interlayer thickness) per layer of the outer dielectric layers 11 is not limited and can be, for example, equal to the interlayer thickness of the inner dielectric layers 10. In the multilayer ceramic capacitor 2 according to the present embodiment, even if the thickness of each of the outer dielectric layers 11 is reduced, the generation of cracking can be sufficiently prevented. Also, the lamination number of the outer dielectric layers 11 is not limited and may be, for example, five layers or more or 20 layers or more.

Figure 3:
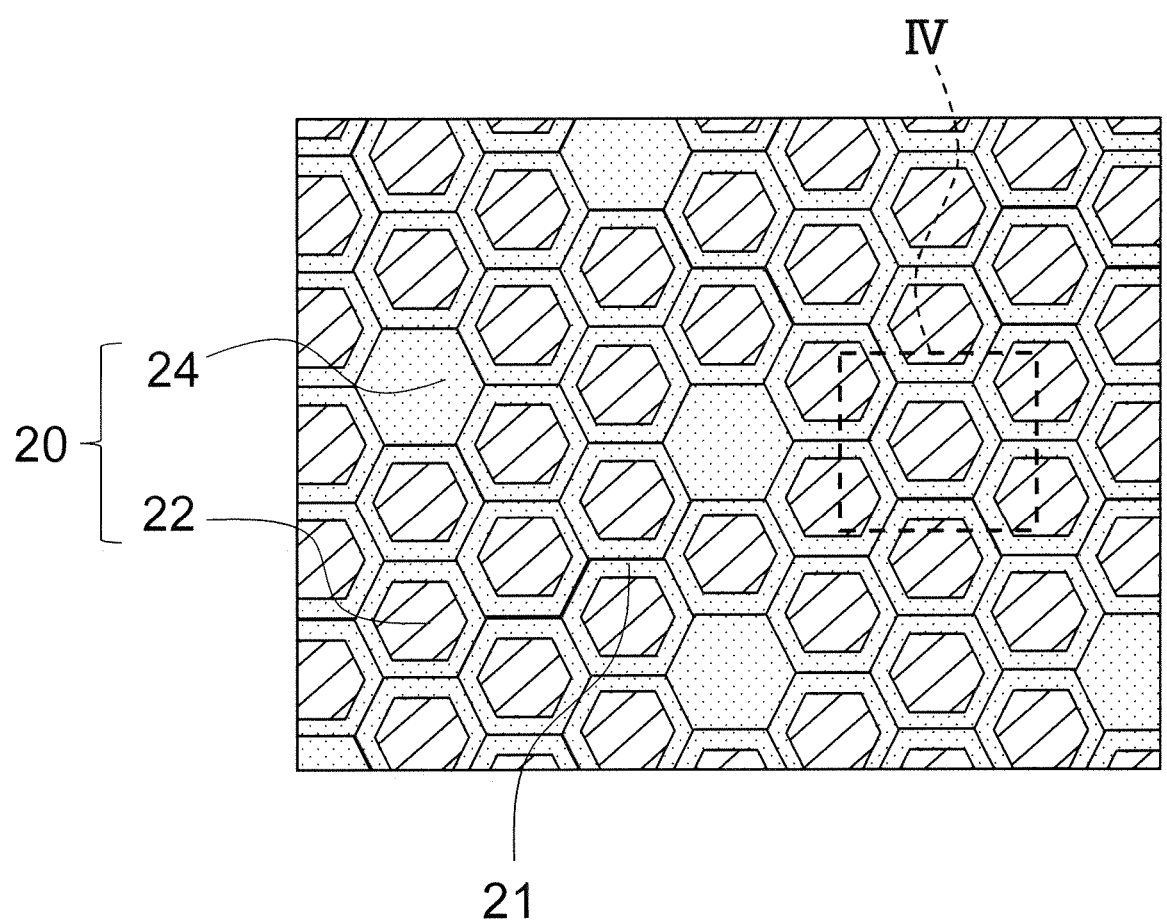
FIG. 3 is a schematic cross-sectional view of inner dielectric layers in an interior region.

FIG. 3 is a schematic cross-sectional view of the inner dielectric layers 10 according to the present embodiment. Note that, the outer dielectric layers 11 may also have the structure shown in FIG. 3.

As shown in FIG. 3, the dielectric layers (the inner dielectric layer 10 and the outer dielectric layers 11) according to the present embodiment include main-phase particles (dielectric particles) 20. A boundary portion between one main phase particle 20 and another main phase particle 20 is a grain boundary 21. Note that, in addition to the main-phase particles 20, the dielectric layers according to the present embodiment may also include segregation particles (not shown) between the main-phase particles 20.

Figure 4:
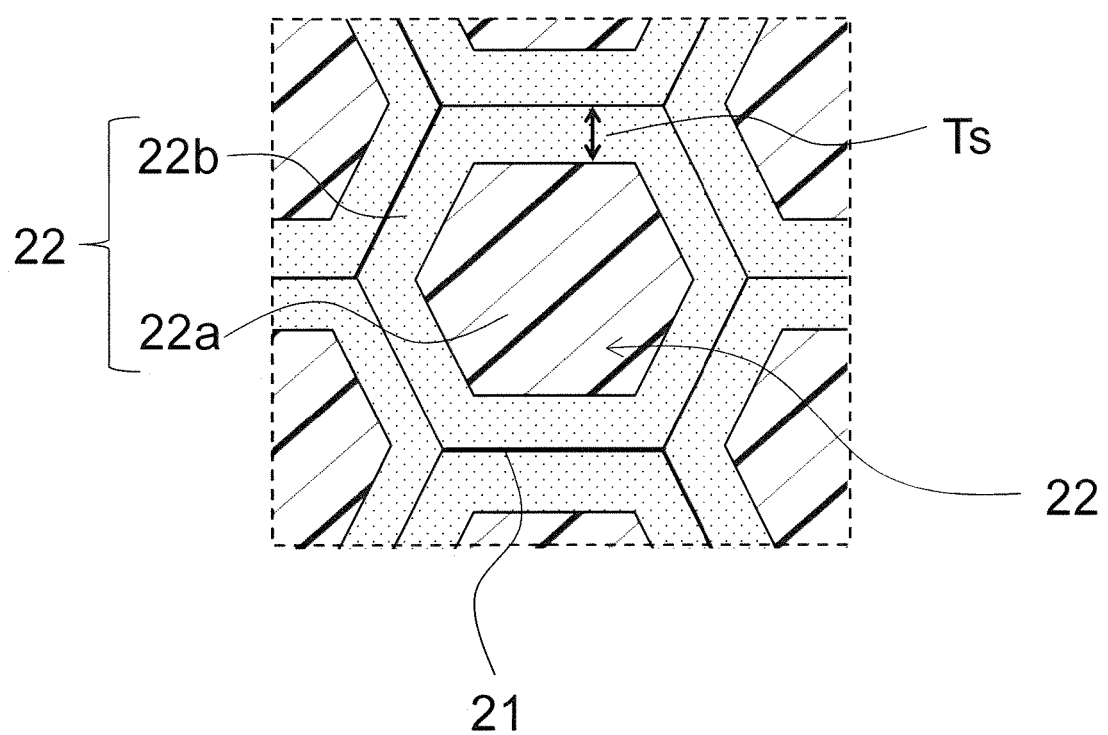
FIG. 4 is an enlarged view of the section IV in FIG. 3.

FIG. 4 is an enlarged view of the section IV in FIG. 3. The main-phase particles 20 may be core-shell main-phase particles 22 having a core-shell structure as shown in FIG. 3 and FIG. 4 or may be complete solid-solution main-phase particles 24 as shown in FIG. 3.

The core-shell structure of the core-shell main-phase particle 22 is a structure including a core portion 22a and a shell portion 22b surrounding the core portion 22a as shown in FIG. 4. In the core-shell main-phase particle 22, subcomponents described below are solid-soluted in the shell portion 22b of the core-shell structure of the main-phase particle 20 to form the shell portion 22b.

As shown in FIG. 3, in the complete solid-solution main-phase particle 24, the subcomponents are solid-soluted in the entire main-phase particle 20, namely, completely solid-soluted.

The main-phase particles 20 according to the present embodiment include a compound having a perovskite crystal structure represented by $ABO_3$ as a main component. Note that, the main component of the main-phase particles 20 is a component that accounts for 80 to 100 parts by mass, preferably 90 to 100 parts by mass, with respect to 100 parts by mass of the main-phase particles. Note that, the main-phase particles 20 may include a component other than the above-mentioned main component. For example, the main-phase particles 20 may include a barium (Ba) compound.

A of $ABO_3$, namely, an A-site element is at least one selected from Ba, strontium (Sr), and calcium (Ca), and A may be at least one selected from Ba and Sr. 80 parts by mol or more of Ba may be included with respect to 100 parts by mol of A, and 90 parts by mol or more of Ba may be included with respect to 100 parts by mol of A. A may be only Ba.

B of $ABO_3$, namely, a B site element is at least one selected from titanium (Ti), zirconium (Zr), and hafnium (Hf). B may be at least one selected from Ti and Zr. 70 parts by mol or more of Ti may be included with respect to 100 parts by mol of B, and 80 parts by mol or more of Ti may be included with respect to 100 parts by mol of B. B may be only Ti.

The composition of the main component is specifically described as $[\{Ba_{(1-x-y)}Ca_xSr_y\}O]_u\{Ti_{(1-z)}Zr_z\}_vO_2$, where A is at least one selected from Ba, Sr, and Ca, and B is at least one selected from Ti and Zr.

x is preferably $0 \leq x \leq 0.10$, more preferably $0 \leq x \leq 0.05$. y is preferably $0 \leq y \leq 0.10$, more preferably $0 \leq y \leq 0.05$. z is preferably $0 \leq z \leq 0.30$, more preferably $0 \leq z \leq 0.15$. u/v is preferably $1.000 \leq u/v \leq 1.030$, more preferably $1.000 \leq u/v \leq 1.015$. When u/v is within the above-mentioned range, sintering can be performed sufficiently compared to when u/v is more than the above-mentioned range, and the relative permittivity and reliability of the dielectric composition tend to improve. When u/v is within the above-mentioned range, the sintering stability is less likely to deteriorate, and the temperature characteristics and reliability of the dielectric composition tend to improve, compared to when u/v is less than the above-mentioned range. When u/v is within the above-mentioned range, it is easy to sufficiently perform sintering, and the relative permittivity, reliability, and temperature characteristics of the multilayer ceramic capacitor 2 tend to further improve.

The dielectric layers include RE, M, and silicon (Si) as subcomponents. In addition to them, the dielectric layers may include Fe, Al, and/or Zr as subcomponents.

As described above, the subcomponents may exist in solid solution in the main-phase particles 20. The subcomponents may be solid-soluted in the shell portion 22b of the core-shell structure of the main-phase particle 20 shown in FIG. 4 to form the shell portion 22b or may be completely solid-soluted in the main-phase particles 20 to form complete solid-solution main-phase particles shown in FIG. 3. In addition, the subcomponents may form segregation particles or exist in the grain boundaries 21 of the main-phase particles 20.

RE is at least one selected from ytterbium (Yb), yttrium (Y), holmium (Ho), dysprosium (Dy), terbium (Tb), gadolinium (Gd), and europium (Eu) and is preferably Dy and/or Y.

Dy, Tb, Gd, and Eu have a comparatively large ionic radius. On the other hand, Yb, Y, and Ho have a comparatively small ionic radius. The larger the ionic radius of RE is, the more easily RE tends to be solid-soluted in the main-phase particles 20. In addition, the smaller the difference between the ionic radius of the A-site element of the main component and the ionic radius of RE is, the more easily RE tends to be solid-soluted in the main-phase particles 20.

When RE with a comparatively large ionic radius is solid-soluted in the main-phase particles 20, RE tends to mainly replace the A-site element of the main component. On the other hand, when RE with a comparatively small ionic radius is solid-soluted in the main-phase particles 20, RE tends to mainly replace the B-site element of the main component.

Then, the more abundantly RE with a comparatively large ionic radius is solid-soluted in the main-phase particles 20, the further the high temperature load life is improved. On the other hand, the more abundantly RE with a comparatively small ionic radius is solid-soluted in the main-phase particles 20, the further the resistance is increased.

M is at least two selected from magnesium (Mg), manganese (Mn), vanadium (V), and chromium (Cr). M is mainly contained in the dielectric layers as an M oxide. M may replace the B-site element of the main component.

The RE content $C_{RE}$ in terms of $RE_2O_3$ is 0.90 parts by mol or more and 3.60 parts by mol or less, preferably 1.5 parts by mol or more and 3.6 parts by mol or less, with respect to 100 parts by mol of the main component in the dielectric layers.

The M content $C_M$ in terms of MO is 0.20 parts by mol or more and 1.20 parts by mol or less, preferably 0.5 parts by mol or more and 1.2 parts by mol or less, with respect to 100 parts by mol of the main component in the dielectric layers.

When M1 is the element with the highest content among M contained in the dielectric layers, the M1 content $C_{M1}$ in terms of M1O is preferably 0.40 parts by mol or more and 0.90 parts by mol or less, more preferably 0.5 parts by mol or more and 0.9 parts by mol or less, with respect to 100 parts by mol of the main component in the dielectric layers.

The Si content $C_{Si}$ in terms of $SiO_2$ is 0.60 parts by mol or more and 1.80 parts by mol or less, preferably 1.0 part by mol or more and 1.8 parts by mol or less, with respect to 100 parts by mol of the main component in the dielectric layers.

The area ratio of the solid-solution region of RE (RE solid-solution region) in a cross section of the main-phase particles 20 constituting the inner dielectric layers 10 is preferably 12% or more and 50% or less, more preferably 15% or more and 35% or less.

As shown in FIG. 3 and FIG. 4, at least a part of the main-phase particles 20 constituting the inner dielectric layers 10 may be the core-shell main-phase particles 22 having a core-shell structure.

The core-shell main-phase particles 22 may be the main-phase particles 20 in which at least RE exists in a part of the peripheral portions of the main-phase particles 20, namely, only in the shell portions 22b. Thus, elements other than RE may be solid-soluted in the core-shell main-phase particles 22.

More specifically, the core-shell main-phase particle 22 is formed of the core portion 22a substantially consisting of only the main component and the shell portion 22b existing around the core portion 22a and in which at least RE replaces a part of the A-site element and/or the B-site element of the main component.

Note that, the core portions 22a substantially consist of only the main component, but may include components (subcomponents, etc.) other than the main component. For example, the core portions 22a may contain 0.0 mass % to 5.0 mass % of components other than the main component. Note that, the concentration of components other than the main component contained in the core portions 22a is lower than the concentration of components other than the main component contained in the shell portions 22b.

The core-shell main-phase particles 22 constituting the inner dielectric layers and having an average thickness of 5 nm or more in the shell portions 22b may be defined as specific core-shell main-phase particles. Preferably, the core-shell main-phase particles 22 constituting the inner dielectric layers 10 and having an average thickness of 10 nm or more and 50 mm or less in the shell portions 22b are defined as specific core-shell main-phase particles.

The number ratio of the specific core-shell main-phase particles to the main-phase particles 20 in the inner dielectric layers 10 is not limited, but is preferably 90% or more. The main-phase particles 20 having no core-shell structure may be the complete solid-solution main-phase particles 24 or may be main-phase particles that are not solid-soluted.

A relation of 180 nm<r1<240 nm is preferably satisfied, and a relation of 200 nm≤r1≤240 nm is more preferably satisfied, in which r1 is an average particle size of the main-phase particles 20 constituting the inner dielectric layers 10.

The composition range of the main component of the main-phase particles 20 constituting the inner dielectric layers 10 and the composition range of the main component of the main-phase particles 20 constituting the outer dielectric layers 11 may be the same or different from each other. Also, the composition range of the subcomponents of the inner dielectric layers 10 and the composition range of the subcomponents of the outer dielectric layers 11 may be the same or different from each other.

A relation of r1<r2<r1×4.0 is satisfied, in which r1 is an average particle size of the main-phase particles 20 constituting the inner dielectric layers 10, and r2 is an average particle size of the main-phase particles 20 constituting the outer dielectric layers 11. Preferably, 1.1≤r2/r1≤2.5 is satisfied.

Figure 2:
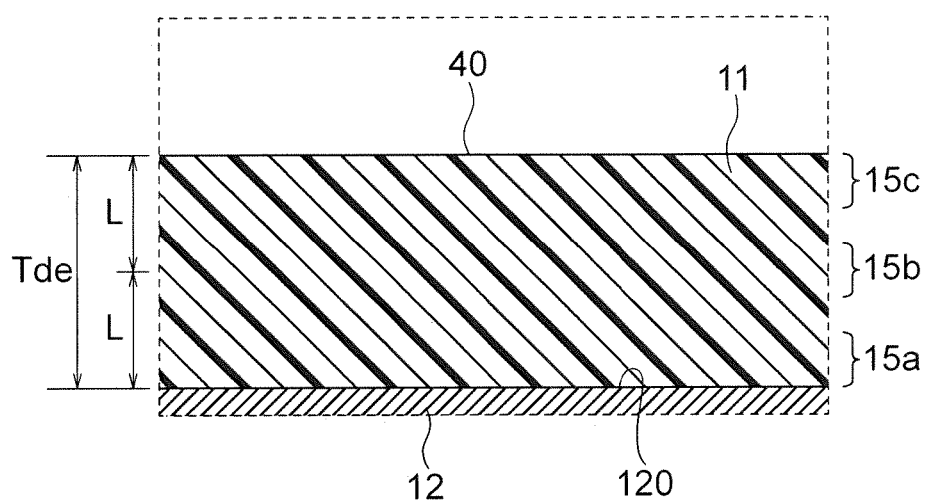
FIG. 2 is an enlarged view of the section II in FIG. 1A.

As shown in FIG. 2, a distance from an outer surface 120 of an outermost layer of the internal electrode layers 12 to an outer surface 40 of the element body 4, namely, to the outer surface of the exterior region 15 is defined as Tde, and the length thereof is defined as 2×L. Note that, the outer surface 40 of the element body 4 is a surface perpendicular to the lamination direction. Tde is not limited, but is 10 µm or more and 1000 µm or less.

Also, an average particle size of the main-phase particles 20 in a first exterior region 15a, which is a region near the internal electrode layers 12 in the exterior region is defined as ra. The range of the first exterior region 15a is not limited and can be, for example, a range of a distance Tde×0.1 from the outer surface 120 of the outermost layer of the internal electrode layers 12 toward the outer surface 40 of the element body 4. A similar range can be employed in the calculation of SNRa described below.

Also, an average particle size of the main-phase particles 20 in a second exterior region 15b, which is a region at an intermediate point between the outer surface 120 of the outermost layer of the internal electrode layers 12 and the outer surface 40 of the element body 4, is defined as rb. The range of the second exterior region 15b is not limited and can be, for example, a range of a distance Tde×0.1 from the "intermediate point between the outer surface 120 of the outermost layer 12 of the internal electrode layers 12 and the outer surface 40 of the element body 4" toward the outer surface 120 of the outermost layer of the internal electrode layers 12 or a range of a distance Tde×0.1 from the "intermediate point between the outer surface 120 of the outermost layer of the internal electrode layers 12 and the outer surface 40 of the element body 4" toward the outer surface 40 of the element body 4. A similar range can be employed in the calculation of SNRb described below.

Moreover, an average particle size of the main-phase particles 20 in a third exterior region 15c, which is a region near the outer surface 40 of the element body 4, is defined as rc. The range of the third exterior region 15c is not limited and can be, for example, a range of a distance Tde×0.1 from the outer surface 40 of the element body 4 toward the outermost layer of the internal electrode layers 12. A similar range can be employed in the calculation of SNRc described below.

Then, preferably, L, ra, rb, and rc satisfy relations of (rb−ra)/L>0.00008 and (rc−rb)/L>0.00008.

Note that, more preferably, "(rb−ra)/L" satisfies a relation of 0.0001≤(rb−ra)/L≤0.01. Also, more preferably, "(rc−rb)/L" satisfies a relation of 0.0001≤(rc−rb)/L≤0.01.

In the present embodiment, preferably, the variation in the particle size of the main-phase particles 20 constituting the inner dielectric layers 10 is smaller than the variation in the particle size of the main-phase particles 20 constituting the outer dielectric layers 11. Specifically, preferably, the SN ratio of particle sizes of the main-phase particles 20 constituting the inner dielectric layers 10 is larger than the SN ratio of particle sizes of the main-phase particles 20 constituting the outer dielectric layers 11. Note that, the SN ratio of particle sizes can be calculated by the following formula (1), where µ is an average particle size, and σ is a standard deviation. Note that, the unit of the SN ratio is "dB".

$$SN\ ratio = 10 \times \log_{10}(\mu^2/\sigma^2) \qquad (1)$$

The SN ratio of particle sizes of the main-phase particles 20 constituting the inner dielectric layers 10 is defined as SNR.

The SN ratio of particle sizes of the main-phase particles 20 in the first exterior region 15a is defined as SNRa.

The SN ratio of particle sizes of the main-phase particles 20 in the second exterior region 15b is defined as SNRb.

Moreover, the SN ratio of particle sizes of the main-phase particles 20 in the third exterior region 15c is defined as SNRc.

In the present embodiment, preferably, SNR, SNRa, SNRb, and SNRc satisfy relations of SNR>SNRa, SNR>SNRb, and SNR>SNRc.

Hereinafter, a method of confirming main-phase particles 20 is exemplified. The method of confirming main-phase particles 20 is not limited.

First, an element body 4 is cut along the lamination direction, and the cut surface is polished to obtain a polished surface. After that, the polished surface is flaked using a focused ion beam (FIB). A flaked measurement sample is subjected to a mapping analysis using a scanning transmission electron microscope (STEM) equipped with an energy dispersive X-ray spectrometer (EDS). Hereinafter, the STEM equipped with the EDS is referred to as a STEM-EDS. The size of the measurement range is not limited and, for example, a mapping image is obtained in a measurement range where five or more internal electrode layers 12 exist within a field of view.

The obtained mapping image is divided into dots of 0.027 µm/pixel, and a contrast intensity of the A-site element and the B-site element in each dot is quantified. Specifically, the contrast intensity is classified into 91 levels from 0 to 90 with the lowest contrast intensity (no detection) being 0 and the highest contrast intensity being 90.

The mapping image obtained by the STEM-EDS is compared with a backscattered electron image obtained by the STEM, and particles with concentrations of the A-site element and the B-site element of the main phase particle 20 being higher than those of their surroundings can be determined to be main-phase particles 20. Moreover, the boundary portions of the main-phase particles 20 can be determined to be grain boundaries 21.

Hereinafter, a method of calculating an area ratio of RE solid-solution regions of inner dielectric layers 10 is exemplified. The method of calculating an area ratio of RE solid-solution regions of inner dielectric layers 10 is not limited.

The mapping image obtained by the STEM-EDS is divided into dots of 0.027 µm/pixel, and the contrast intensity of RE in each dot is quantified. Specifically, the contrast intensity is classified into 91 levels from 0 to 90 with the lowest contrast intensity (no detection) being 0 and the highest contrast intensity being 90.

A dot region whose contrast intensity of RE in the main-phase particles 20 is 25 or more is defined as an RE solid-solution region.

Also, a total area of the main-phase particles 20 in the measurement range is obtained, and an area ratio of the RE solid-solution regions in the inner dielectric layers 10 is obtained (an area ratio of the RE solid-solution regions=an area of the RE solid-solution regions/a total area of the main-phase particles 20).

Thus, in addition to the shell portions 22b of the core-shell main-phase particles 22, the RE solid-solution regions also include complete solid-solution main-phase particles 24.

Hereinafter, a method of determining whether or not each of the main-phase particles 20 is a specific core-shell main-phase particle is exemplified. The method of determining whether or not each of the main-phase particles 20 is a specific core-shell main-phase particle is not limited.

In the mapping image obtained by the STEM-EDS, assuming that the RE solid-solution region is the shell portion 22b for one main-phase particle 20 within the field of view of mapping, each of the thickness Ts of the shell portion 22b considered to be the thinnest and the thickness Ts of the shell portion 22b considered to be the thickest is subjected to a line analysis across the grain boundary 21 so as to calculate an average thickness of the shell portions 22b, and this is defined as an average thickness of the shell portions 22b of this one main phase particle 20.

Here, the main phase particles 20 having an average thickness of 5 nm or more in the shell portions 22b are defined as specific core-shell main phase particles 22. Any ten or more main-phase particles 20 of the inner dielectric layers 10 are analyzed in the same manner, and the number ratio of the specific core-shell main-phase particles 22 to the number of analyzed main-phase particles 20 is represented as a "number ratio of the specific core-shell main-phase particles 20 to the main-phase particles 20".

2. Method of Manufacturing Multilayer Ceramic Capacitor

Next, an example of a method of manufacturing a multilayer ceramic capacitor 2 shown in FIG. 1A is described below.

Similarly to conventional multilayer ceramic capacitors, the multilayer ceramic capacitor 2 according to the present embodiment is manufactured by producing a green chip with a normal printing method or sheet method using paste, firing this, and thereafter printing or transferring external electrodes and firing them. Hereinafter, the manufacturing method is specifically described.

First, dielectric raw materials for forming dielectric layers are prepared and turned into a paint to prepare a dielectric-layer paste.

As the dielectric raw materials, a raw material of $ABO_3$ (main component) and raw materials of other various oxides are prepared. As these raw materials, it is possible to employ oxides of the above-mentioned components, their mixtures and composite oxides, and it is also possible to appropriately select various compounds to be the above-mentioned oxides and composite oxides by firing, such as carbonates, oxalates, nitrates, hydroxides, and organometallic compounds, and mix them.

The particle size of the raw material powder of $ABO_3$ (main component) is not limited and is, for example, 150 to 200 nm.

In the present embodiment, it is preferable to employ a mixture in which oxides of the above-described components are uniformly dispersed with respect to the main component, but it is also possible to employ dielectric raw materials in which the main component is coated with the above-described components. Except for the raw materials of the main component, for example, it is also possible to employ an RE oxide, an M oxide, or a Si compound.

Note that, the raw material of $ABO_3$ (main component) can be produced by various methods, such as various liquid-phase methods (e.g., the oxalate method, hydrothermal synthesis method, alkoxide method, sol-gel method, etc.), in addition to so-called solid-phase methods.

Moreover, when the dielectric layers contain components other than the above-mentioned components, raw materials of these components can be oxides of these components or their mixtures and composite oxides. In addition, it is also possible to employ various compounds to be the above-mentioned oxides or composite oxides by firing.

The amount of each compound in the dielectric raw material is determined so that the above-mentioned composition of the dielectric layers is obtained after firing.

0.1 parts by mol or more and 2.0 parts by mol or less of $BaCO_3$ powder may be contained in terms of $BaCO_3$ with respect to 100 parts by mol of the main component.

Among the raw materials of other various oxides mentioned above, any two or more may be mixed and calcined before being mixed with the main component. For example, the raw material of an RE oxide, the raw material of a Si oxide, and the raw material of an A oxide (e.g., the raw material of a Ba oxide) contained separately from the main component may be mixed in advance and calcined. The calcination temperature is less than 1100° C. Then, the compound powder obtained by the calcination, the main component, and the raw materials of various oxides that are not calcined may be mixed. This changes the ease of solid solution of RE into the main-phase particles 20.

The dielectric-layer paste may be an organic based paint obtained by kneading the dielectric raw materials and an organic vehicle or may be a water based paint.

The organic vehicle is a binder dissolved in an organic solvent. Known binders and solvents are employed.

When the dielectric-layer paste is a water based paint, a water based vehicle obtained by dissolving a water-soluble binder, a dispersant, and the like in water is kneaded with the dielectric raw materials. The water-soluble binder is not limited and is, for example, polyvinyl alcohol, cellulose, water-soluble acrylic resin, or the like.

An internal-electrode-layer paste is prepared by kneading the above-mentioned organic vehicle and the conductive material composed of Ni or Ni alloy mentioned above or various oxides, organometallic compounds, resinates, etc. to be Ni or Ni alloy mentioned above after firing. The internal-electrode-layer paste may contain an inhibitor. The inhibitor is not limited and may have a similar composition to the main component.

An external-electrode paste is prepared in the same manner as the above-mentioned internal-electrode-layer paste by using a conductive material composed of Cu or Cu alloy mentioned above as an inorganic component.

The amount of the organic vehicle in each of the above-mentioned pastes is not limited and is a normal amount. For example, the amount of the binder is about 1 to 15 mass %, and the amount of the solvent is about 10 to 60 mass %. If necessary, each of the pastes may contain additives selected from various dispersants, plasticizers, dielectrics, insulators, etc. The total amount of them may be 10 mass % or less.

An appropriate number of green sheets is formed on a substrate, such as PET, using the dielectric-layer paste for outer dielectric layers and pressed in the lamination direction to obtain an exterior-region green laminate.

Next, green sheets are formed using the dielectric-layer paste for inner dielectric layers, internal electrode pattern layers are formed thereon using the internal-electrode layer paste, and the green sheets are peeled from the substrate. Then, green sheets with the internal electrode pattern layers are prepared.

Next, the green sheets with the internal electrode pattern layers are laminated on the exterior-region green laminate and subjected to pressure bonding as necessary so as to obtain an interior-region green laminate constituting the interior region 13 after firing.

The method of forming the internal electrode pattern layers is not limited and may be formed by a printing method, a transfer method, or a thin film formation method such as vapor deposition and sputtering.

Next, an appropriate number of green sheets for outer dielectric layers is further formed on the interior-region green laminate using the dielectric-layer paste for outer dielectric layers and pressed in the lamination direction to obtain a green laminate of the element body 4. Each of the green sheets for outer dielectric layers may be only a single layer or may be multiple layers.

The green laminate of the element body 4 is cut into a predetermined shape and thereafter peeled from the substrate to obtain a green chip.

Before firing, the green chip is subjected to a binder removal treatment. As the binder removal conditions, the heating rate is preferably 5 to 300° C./hour, the binder removal temperature is preferably 180 to 900° C., and the holding time is preferably 0.5 to 48 hours. The atmosphere of the binder removal treatment is the air or a reducing atmosphere (e.g., a humidified $N_2+H_2$ mixed gas atmosphere).

After removing the binder, the green chip is fired. For example, the heating rate may be 200 to 20000° C./h, the firing temperature may be 1150 to 1350° C., and the holding time may be 0.1 to 10 hours.

The atmosphere during firing is not limited, either, and may be the air or a reducing atmosphere. The atmosphere gas for the reducing atmosphere can be, for example, a humidified mixed gas of $N_2$ and $H_2$. The oxygen partial pressure may be $1.0\times10^{-14}$ to $1.0\times10^{-9}$ MPa.

When the oxygen partial pressure during firing is lower, the solid solution of RE into the main-phase particles 20 more easily progresses, the concentration of RE existing in the grain boundaries 21 thereby decreases, and as a result, the grain growth of the main-phase particles 20 can be promoted to some extent.

When the oxygen partial pressure during firing is adjusted in such a manner, the particle sizes of the main-phase particles 20 constituting the inner dielectric layers and/or the outer dielectric layers 11 can be adjusted within a desired range. That is, the particle sizes of the main-phase particles 20 constituting the inner dielectric layers and/or the outer dielectric layers 11 can be adjusted so that the relation of r1<r2<r1×4.0 and the relations of (rb−ra)/L>0.00008 and (rc−rb)/L>0.00008 are easily satisfied.

In the present embodiment, preferably, the element body 4 after firing is subjected to an annealing treatment (an oxidation treatment of the dielectric layers). Specifically, the annealing temperature may be 950 to 1100° C. The holding time may be 0.1 to 20 hours. The atmosphere during the oxidation treatment may be a humidified $N_2$ gas (oxygen partial pressure: $1.0\times10^{-9}$ to $1.0\times10^{-6}$ MPa).

In the binder removal treatment, the firing, and the annealing treatment described above, when a $N_2$ gas, a mixed gas, or the like is humidified, for example, a wetter is employed. In this case, the water temperature is preferably about 5 to 75° C.

The binder removal treatment, the firing, and the annealing treatment may be performed continuously or independently.

The element body 4 obtained as described above is subjected to an end surface polishing by barrel polishing, sandblasting, or the like, and an external-electrode paste is applied and fired to form external electrodes 6. Then, if necessary, a coating layer is formed on the surfaces of the external electrodes 6 by plating or the like.

The multilayer ceramic capacitor 2 according to the present embodiment manufactured in such a manner is mounted on a printed board or the like by soldering or the like and used for various electronic devices or the like.

In the multilayer ceramic capacitor 2 according to the present embodiment, $C_{RE}$ is 0.90 parts by mol or more and 3.60 parts by mol or less in terms of $RE_2O_3$, $C_M$ is 0.20 parts by mol or more and 1.20 parts by mol or less in terms of MO, $C_{Si}$ is 0.60 parts by mol or more and 1.80 parts by mol or less in terms of $SiO_2$, and r1 and r2 satisfy the relation of r1<r2<r1×4.0.

In the multilayer ceramic capacitor according to the present embodiment, in particular, since each of $C_{RE}$, $C_M$, and $C_{Si}$ is within the above-mentioned range, the high temperature load life is favorable. This is probably because, since each of $C_{RE}$, $C_M$, and $C_{Si}$ is within the above-mentioned range, the donor component and the acceptor component in the main-phase particles 20 are easily balanced.

Specifically, RE is solid-soluted in the main-phase particles 20 as a donor component when the A-site element is replaced by RE, and RE and/or M are/is solid-soluted in the main-phase particles 20 as an acceptor component when the B-site element is replaced by RE and/or M.

When the donor component is in an appropriate amount, the resistance is favorable, and the high temperature load life is favorable, compared to when the donor component is too much. On the other hand, when the acceptor component is in an appropriate amount, the amount of oxygen defects can be restrained, and the high temperature load life is favorable, compared to when the acceptor component is too much.

In the multilayer ceramic capacitor 2 according to the present embodiment, in particular, since each of $C_{RE}$, $C_M$, and $C_{Si}$ is within the above-mentioned range, the solid solution amount of subcomponents in the main-phase particles 20 is appropriate, and the temperature characteristics are thus considered to be favorable.

Moreover, in the multilayer ceramic capacitor 2 according to the present embodiment, in particular, since r1 and r2 satisfy the relation of r1<r2<r1×4.0, the hardness of the exterior regions 15 is higher than that of the interior region 13.

In conventional multilayer ceramic capacitors, since it is difficult to promote firing in the exterior regions compared to the interior region, voids are likely to occur in the exterior regions, and it tends to be difficult to increase the hardness of the exterior regions.

On the other hand, in the present embodiment, due to the influence of the average particle sizes of the raw material powders of components and the main component contained in the dielectric layers, and the like, it can be confirmed that the grain growth of the main-phase particles 20 constituting the outer dielectric layers 11 tend to be promoted by firing more than that of the main-phase particles 20 constituting the inner dielectric layers 10. As a result, the outer dielectric layers 11 have a denser structure, in other words, a higher density structure than the inner dielectric layers 10, and the hardness of the exterior regions 15 is considered to be high.

According to the present embodiment, in the firing step, the average particle size of the main-phase particles 20 constituting the outer dielectric layers 11 can be larger in a predetermined range than the average particle size of the main-phase particles 20 constituting the inner dielectric layers 10.

For example, for the purpose of differentiating the particle sizes of the main-phase particles between the inner dielectric layers and the outer dielectric layers, Patent Document 1 studies a method of differentiating the particle size of the raw material powder of the main component of the main-phase particles contained in the dielectric-layer paste for inner dielectric layers and the particle size of the raw material powder of the main component of the main-phase particles contained in the dielectric-layer paste for outer dielectric layers.

In recent years, however, the raw material powder of the main component of the main-phase particles has been finer, and it is thus becoming difficult to prepare a uniformly dispersed dielectric-layer paste. Then, it is expected that it is technically difficult to achieve a method of differentiating the particle size of the raw material powder of the main component of the main-phase particles contained in the dielectric-layer paste for inner dielectric layers and the particle size of the raw material powder of the main component of the main-phase particles contained in the dielectric-layer paste for outer dielectric layers.

On the other hand, in the present embodiment, even if raw material powders of the main component having the same average particle size are employed for the inner dielectric layers 10 and the outer dielectric layers 11, the grain growth of the main-phase particles 20 constituting the outer dielectric layers 11 is promoted in the firing step more than the grain growth of the main-phase particles 20 constituting the inner dielectric layers 10, and as a result, the average particle size of the main-phase particles 20 constituting the outer dielectric layers 11 can be larger in a predetermined range than the average particle size of the main-phase particles 20 constituting the inner dielectric layers 10. Thus, in the present embodiment, it is comparatively easy to differentiate the particle sizes of the main-phase particles 20 between the inner dielectric layers 10 and the outer dielectric layers 11.

Note that, in the present embodiment, the average particle size of the main-phase particles 20 constituting the inner dielectric layers 10 and the average particle size of the main-phase particles 20 constituting the outer dielectric layers 11 may be the same or different from each other.

Hereinabove, an embodiment of the present invention is described, but the present invention is not limited to the above-described embodiment at all and may variously be modified within the scope of the present invention.

3. Modification

In the above-described embodiment, the multilayer electronic device according to the present invention is a multilayer ceramic capacitor, but the multilayer electronic device according to the present invention is not limited to a multilayer ceramic capacitor and is a multilayer electronic device having the above-described features.

EXAMPLES

Hereinafter, the present invention is described in more detail with Examples and Comparative Examples. However, the present invention is not limited to Examples below.

Experiment 1

Experiment 1 relates to Examples or Comparative Examples shown in Table 1A and Table 1B.

(Manufacturing Method (1))

For Examples or Comparative Examples in which multilayer ceramic capacitor samples were manufactured by Manufacturing Method (1), "(1)" is shown in the columns of "Manufacturing Method" of Table 1B, Table 2B, Table 3B, Table 4B, Table 5B and Table 6B.

In Manufacturing Method (1), a dielectric-layer paste for inner dielectric layers and a dielectric-layer paste for outer dielectric layer were prepared in the same manner, and the "dielectric-layer paste for outer dielectric layers" and the "dielectric-layer paste for outer dielectric layer" are thus collectively referred to as a "dielectric-layer paste".

A $BaTiO_3$ powder was prepared as a raw material powder of the main component. In the $BaTiO_3$ powder, Ba/Ti was 1.000, and the average particle size was 180 nm.

Also, a $Dy_2O_3$ powder was prepared as a raw material powder of an RE oxide.

Also, a MgO powder, a $MnCO_3$ powder, and a $V_2O_5$ powder were prepared as raw material powders of an M oxide. Note that, $MnCO_3$ would be contained in the dielectric layers as MnO after firing.

Also, a $SiO_2$ powder was prepared as a raw material powder of a Si oxide.

Moreover, a $BaCO_3$ powder was prepared as a raw material powder of a Ba oxide.

Next, each of the above-prepared raw material powders was weighed so that the ratio shown in Table 1A was obtained with respect to 100 parts by mol of the main component. Also, the $BaCO_3$ powder was weighed so as to have 1.0 part by mol in terms of $BaCO_3$ with respect to 100 parts by mol of the main component. Note that, $BaCO_3$ would be contained in the dielectric layers as BaO after firing. Each of the weighed raw material powders was wet-mixed and pulverized in a ball mill for 20 hours and dried to obtain a dielectric raw material.

Next, 10 parts by mass of polyvinyl butyral resin, 5 parts by mass of dioctyl phthalate (DOP) as a plasticizer, and 100 parts by mass of alcohol as a solvent with respect to 100 parts by mass of the dielectric raw material were mixed in a ball mill and turned into a paste to obtain a dielectric-layer paste.

Ni powder, terpineol, ethyl cellulose, and benzotriazole were prepared in a weight proportion of 44.6:52.0:3.0:0.4. Then, these were kneaded by a triple roll and turned into a paste to prepare an internal-electrode-layer paste.

Using the dielectric-layer paste prepared above, a green sheet for outer dielectric layers was formed on a PET film so that the thickness after drying would be 6.0 μm, and pressure was applied in the lamination direction to form an exterior-region green laminate.

Next, using the dielectric-layer paste, a green sheet was formed so that the thickness after drying would be 4.0 μm, and electrode layers were printed in a predetermined pattern thereon using the internal-electrode-layer paste. After that, the sheet was peeled off from the PET film to prepare a green sheet having an internal electrode pattern layer. Next, a plurality of green sheets having internal electrode pattern layers was laminated on the exterior-region green laminate and bonded under pressure to obtain a laminate.

Next, the dielectric-layer paste was further used to form a plurality of green sheets for outer dielectric layers on the laminate, and pressure was applied in the lamination direction to obtain a green laminate of the element body 4. This green laminate was cut into a predetermined size to obtain a green chip.

Next, the obtained green chip was subjected to a binder removal treatment, a firing, and an oxidation treatment to obtain an element body as a sintered body.

As the conditions for the binder removal treatment, the heating rate was 25° C./h, the binder removal temperature was 235° C., the holding time was 8 hours, and the atmosphere was the air.

As the conditions for the firing, the heating rate was 200° C./h, the holding temperature was 1280° C., the holding time was 2 hours, and the cooling rate was 200° C./h. The atmosphere was a humidified $N_2+H_2$ mixed gas atmosphere. The oxygen partial pressure was about $5.0 \times 10^{-11}$ MPa.

As the conditions for the oxidation treatment, the heating rate and the cooling rate were 200° C./h, the oxidation treatment temperature was 1050° C., the holding time was 3 hours, the atmosphere was a humidified $N_2$ gas atmosphere, and the oxygen partial pressure was $1.0 \times 10^{-7}$ MPa.

A wetter was used to humidify the atmospheres during the firing and the oxidation treatment.

Next, after the end surfaces of the obtained element body were subjected to barrel polishing, a Cu paste was applied as external electrodes and baked in a reducing atmosphere to obtain a multilayer ceramic capacitor sample shown in FIG. 1A. The size of the obtained capacitor sample was 3.2 mm×1.6 mm×0.5 mm, the thickness of each of the inner dielectric layers was 3.0 μm, the thickness of each of the internal electrode layers was 1.0 μm, and the thickness of each of the exterior regions (Tde) was 210 μm. Also, the number of inner dielectric layers was 20.

(Manufacturing Method (2))

For a Comparative Example in which a multilayer ceramic capacitor sample was manufactured by Manufacturing Method (2), "(2)" is shown in the column of "Manufacturing Method" of Table 1B.

In Manufacturing Method (2), the multilayer ceramic capacitor sample was manufactured in the same manner as in Manufacturing Method (1), except that Ba/Ti of the $BaTiO_3$ powder, which was the raw material powder of the main component of the dielectric raw material contained in the dielectric-layer paste for outer dielectric layers, was 1.02.

(Manufacturing Method (3))

For a Comparative Example in which a multilayer ceramic capacitor sample was manufactured by Manufacturing Method (3), "(3)" is shown in the column of "Manufacturing Method" of Table 1B.

In Manufacturing Method (3), the multilayer ceramic capacitor sample was manufactured in the same manner as in Manufacturing Method (1), except that the average particle size of the $BaTiO_3$ powder, which was the raw material powder of the main component of the dielectric raw material contained in the dielectric-layer paste for outer dielectric layers, was 100 nm.

(Average Particle Size of Main-Phase Particles)

Each of the obtained multilayer ceramic capacitor samples was cut along the lamination direction, and the obtained cut surface was polished. Then, this polished surface was subjected to chemical etching, and an interior region and exterior regions were thereafter observed with a scanning electron microscope (SEM).

An area of each of the main-phase particles in the interior region was calculated. Also, an area of each of the main-phase particles in the exterior regions was calculated. Then, a value obtained by converting the calculated area into an equivalent circle diameter was defined as a particle size of each of the main-phase particles. The average value of the particle sizes of a total of about 1,000 main-phase particles in five fields of view of the interior region was defined as an average particle size r1. Also, the average value of the particle sizes of a total of about 1,000 main-phase particles in the five fields of view of a second exterior region was defined as an average particle size r2.

The case satisfying "r1<r2<r1×4.0" was evaluated as "OK", and the case not satisfying "r1<r2<r1×4.0" was evaluated as "NG". The results are shown in Table 1A.

Also, the results of "r2/r1" are shown in Table 1A.

(Vickers Hardness)

Each of the obtained multilayer ceramic capacitor samples was fixed on a stage so that the exterior regions were located above, and a Vickers hardness was measured in the vicinity of the center of the outer surfaces of the exterior regions under a load of 200 mN. The unit of the Vickers hardness was $HV_{0.0204}$. The above evaluation was performed on five multilayer ceramic capacitor samples, and an average value of the Vickers hardness was calculated. An average value of the Vickers hardness with 850 or more was evaluated as "A", an average value of the Vickers hardness with 800 or more and less than 850 was evaluated as "B", and an average value of the Vickers hardness with less than 800 was evaluated as "NG". The results are shown in Table 1B.

High Temperature Load Life (MTTF)

A DC voltage was applied to the obtained multilayer ceramic capacitor samples under an electric field of 40 V/μm at 180° C., and the time from the start of application until the insulation resistance dropped by one digit was defined as a high temperature load life. This evaluation was performed on 20 multilayer ceramic capacitor samples, and this average value was defined as a high temperature load life (MTTF). A high temperature load life of 25 hours or more was evaluated as "A", a high temperature load life of 20 hours or more and less than 25 hours was evaluated as "B", and a high temperature load life of less than 20 hours was evaluated as "NG". The results are shown in Table 1B.

(Capacitance Change Rate (X7S Characteristics))

The obtained multilayer ceramic capacitor samples were measured for capacitance at −55° C. to 125° C. under conditions of a frequency of 1.0 kHz and an input signal level (measurement voltage) of 1.0 Vrms, and a change rate ΔC in capacitance was calculated based on the capacitance at 25° C. Then, it was evaluated whether or not the X7S characteristics, which are the temperature characteristics of the EIA standard, were satisfied. In the present examples, it was evaluated whether or not the capacitance change rate ΔC on the high temperature side (125° C.) was within ±22%. This is because, if the capacitance change rate at 125° C. satisfies ±22%, the capacitance change rate at −55° C. can also satisfy the X7S characteristics. The case where the capacitance change rate ΔC on the high temperature side (125° C.) was within ±22% was evaluated as "OK", and the case where the capacitance change rate ΔC on the high temperature side (125° C.) was not within ±22% was evaluated as "NG". The results are shown in Table 1B.

(Overall Determination)

The multilayer ceramic capacitor sample evaluated as "NG" for at least one of "Vickers Hardness", "MTTF", and "Capacitance Change Rate" was evaluated as "NG" (Comparative Example).

Among the multilayer ceramic capacitor samples evaluated as "OK" in "Capacitance Change Rate" (Examples), the multilayer ceramic capacitor samples evaluated as "A" in both of "Vickers Hardness" and "MTTF" were evaluated as "AA".

Among the multilayer ceramic capacitor samples evaluated as "OK" in "Capacitance Change Rate" (Examples), the multilayer ceramic capacitor samples evaluated as "A" in only one of "Vickers Hardness" and "MTTF" were evaluated as "A".

Among the multilayer ceramic capacitor samples evaluated as "OK" in "Capacitance Change Rate" (Examples), the multilayer ceramic capacitor samples evaluated as "B" in both of "Vickers Hardness" and "MTTF" were evaluated as "B".

The results of the overall determination are shown in Table 1B.

Experiment 2

Experiment 2 relates to Examples shown in Table 2A and Table 2B.

Example 1 in Table 2A and Table 2B was the same sample as Example 1 in Table 1A and Table 1B. Also, Example 8 in Table 2A and Table 2B was the same sample as Example 8 in Table 1A and Table 1B.

(Manufacturing Method (4))

For an Example in which a multilayer ceramic capacitor sample was manufactured by Manufacturing Method (4), "(4)" is shown in the column of "Manufacturing Method" of Table 2B. That is, Example 9 was manufactured by Manufacturing Method (4).

In Manufacturing Method (4), the multilayer ceramic capacitor sample was manufactured in the same manner as in Manufacturing Method (1), except that the oxygen partial pressure during firing was about $1.0 \times 10^{-11}$ MPa.

In Experiment 2, whether or not "r1<r2<r1×4.0" was satisfied was determined in the same manner as in Experiment 1, the Vickers hardness was measured, the MTTF was measured, the capacitance change rate was measured, and an overall determination was performed. The results are shown in Table 2A or Table 2B.

In Experiment 2, it was also determined whether or not "(rb−ra)/L>0.00008 and (rc−rb)/L>0.00008" was satisfied. Specifically, among the chemically etched polished surfaces of the multilayer ceramic capacitor sample in (Average Particle Size of Main-Phase Particles) described above, five fields of view each containing 300 or more main-phase particles in each of a first exterior region, a second exterior region, and a third exterior region were observed by SEM.

The value obtained by converting the observed area of each of the main-phase particles into an equivalent circle diameter was defined as a particle size of each of the main-phase particles. The average value of the particle sizes of about 1,000 main-phase particles in the first exterior region was defined as an average particle size ra. Also, the average value of the particle sizes of about 1,000 main-phase particles in the second exterior region was defined as an average particle size rb. Moreover, the average value of the particle sizes of about 1,000 main-phase particles in the third exterior region was defined as an average particle size rc.

The polished surfaces after the chemical etching were observed by SEM in a field of view including the entire thickness Tde direction of the exterior regions, and L was calculated.

Based on L, ra, rb, and rc obtained in the above-mentioned manner, whether or not each Example satisfied "(rb−ra)/L>0.00008 and (rc−rb)/L>0.00008" was determined. The case satisfying "(rb−ra)/L>0.00008 and (rc−rb)/L>0.00008" was determined to be "OK", and the case not satisfying "(rb−ra)/L>0.00008 and (rc−rb)/L>0.00008" was determined to be "NG". The results are shown in Table 2A.

Experiment 3

Experiment 3 relates to Examples shown in Table 3A and Table 3B.

Example 7 in Table 3A and Table 3B was the same sample as Example 7 in Table 1A and Table 1B. Also, Example 8 in Table 3A and Table 3B was the same sample as Example 8 in Table 1A and Table 1B.

(Manufacturing Method (5))

For a Comparative Example in which a multilayer ceramic capacitor sample was manufactured by Manufacturing Method (5), "(5)" is shown in the column of "Manufacturing Method" of Table 3B. That is, Comparative Example 9 was manufactured by Manufacturing Method (5).

In Manufacturing Method (5), the multilayer ceramic capacitor sample was manufactured in the same manner as in Manufacturing Method (1), except that the average particle size of the $BaTiO_3$ powder, which was the raw material powder of the main component of the dielectric raw material contained in the dielectric-layer paste for inner dielectric layers, was 120 nm.

In Experiment 3, whether or not "r1<r2<r1×4.0" was satisfied was determined in the same manner as in Experiment 1, the Vickers hardness was measured, the MTTF was measured, the capacitance change rate was measured, and an overall determination was performed. The results are shown in Table 3A or Table 3B.

Note that, in Experiment 3, it was also determined whether or not "SNR>SNRa, SNR>SNRb, and SNR>SNRc" was satisfied. Specifically, based on the particle sizes of the main-phase particles of the inner dielectric layers measured in Experiment 1 mentioned above and the particle sizes of the main-phase particles in the first exterior region, the second exterior region, and the third exterior region measured in Experiment 2 mentioned above, the SN ratio was calculated by the calculation method for SN ratio described in the above embodiment, and it was thereby determined whether or not each of Examples or the Comparative Example satisfied "SNR>SNRa, SNR>SNRb, and SNR>SNRc".

The case satisfying "SNR>SNRa, SNR>SNRb, and SNR>SNRc" was determined to be "OK", and the case not satisfying "SNR>SNRa, SNR>SNRb, and SNR>SNRc" was determined to be "NG".

Experiment 4

Experiment 4 relates to Examples shown in Table 4A and Table 4B.

Example 1 in Table 4A and Table 4B was the same sample as Example 1 in Table 1A and Table 1B. Also, Example 8 in Table 4A and Table 4B was the same sample as Example 8 in Table 1A and Table 1B. Moreover, Comparative Example 9 in Table 4A and Table 4B was the same sample as Comparative Example 9 in Table 3A and Table 3B.

In Example 10, the multilayer ceramic capacitor sample was manufactured in the same manner as in Example 1, except that $C_{RE}$ was changed.

In Experiment 4, it was determined whether or not "r1<r2<r1×4.0" was satisfied in the same manner as in Experiment 1, the Vickers hardness was measured, the MTTF was measured, the capacitance change rate was measured, and an overall determination was performed. The results are shown in Table 4A or Table 4B.

Note that, in Experiment 4, an "area ratio of the RE solid-solution regions in the inner dielectric layers" and a "number ratio of the specific core-shell main-phase particles to the main-phase particles" were also calculated. Specifically, the chemically etched polished surfaces of the multilayer ceramic capacitor sample in (Average Particle Size of Main-Phase Particles) described above were observed by SEM, and an "area ratio of the RE solid-solution regions in the inner dielectric layers" and a "number ratio of the specific core-shell main-phase particles to the main-phase particles" were calculated by the method described in the above embodiment. The results are shown in Table 4A.

Experiment 5

Experiment 5 relates to Examples shown in Table 5A and Table 5B.

Example 8 in Table 5A and Table 5B was the same sample as Example 8 in Table 1A and Table 1B, and Example 5 in Table 5A and Table 5B was the same sample as Example 5 in Table 5A and Table 5B.

In Example 11, the multilayer ceramic capacitor sample was manufactured in the same manner as in Example 8, except that $C_{M1}$ was 0.30 parts by mol, and that the amount of Mn and V other than Mg (M1) were increased.

In Example 12, the multilayer ceramic capacitor sample was manufactured in the same manner as in Example 12, except that $C_{M1}$ was 0.95 parts by mol, and that the amount of Mn and V other than Mg (M1) were decreased.

In Experiment 5, whether or not "r1<r2<r1×4.0" was satisfied was determined in the same manner as in Experiment 1, the Vickers hardness was measured, the MTTF was measured, the capacitance change rate was measured, and an overall determination was performed. The results are shown in Table 5A or Table 5B.

Experiment 6

Experiment 6 relates to Examples described in Table 6A and Table 6B.

Example 8 in Table 6A and Table 6B was the same sample as Example 8 in Table 1A and Table 1B.
(Manufacturing Method (6))

For an Example in which a multilayer ceramic capacitor sample was manufactured by Manufacturing Method (6), "(6)" is shown in the column of "Manufacturing Method" of Table 6B. That is, Example 13 was manufactured by Manufacturing Method (6).

In Manufacturing Method (6), the multilayer ceramic capacitor sample was manufactured in the same manner as in Manufacturing Method (1), except that the oxygen partial pressure during firing was about $1.0 \times 10^{-10}$ MPa.

For an Example in which a multilayer ceramic capacitor sample was manufactured by Manufacturing Method (7), "(7)" is shown in the column of "Manufacturing Method" of Table 7B. That is, Example 14 was manufactured by Manufacturing Method (7).

In Manufacturing Method (7), the multilayer ceramic capacitor sample was manufactured in the same manner as in Manufacturing Method (1), except that the average particle size of the $BaTiO_3$ powder, which was the raw material powder of the main component of the dielectric raw material contained in the dielectric-layer paste for inner dielectric layers, was 230 nm.

In Experiment 6, whether or not "r1<r2<r1×4.0" was satisfied was determined in the same manner as in Experiment 1, the Vickers hardness was measured, the MTTF was measured, the capacitance change rate was measured, and an overall determination was performed. The results are shown in Table 6A or Table 6B.

Note that, in Experiment 6, an "average particle size (r1) of the main-phase particles constituting the inner dielectric layers" was also measured. Specifically, it was calculated by the method in (Average Particle Size of Main-Phase Particles) described above. The results are shown in Table 6A.

TABLE 1A

| | $C_{RE}$ [parts by mol] | $C_M$ [parts by mol] | $C_{Si}$ [parts by mol] | r1 < r2 < r1 × 4.0 | r2/r1 |
|---|---|---|---|---|---|
| Comp. Ex. 1 | 0.8 | 0.60 | 1.0 | NG | 1.0 |
| Ex. 1 | 0.9 | 0.70 | 0.9 | OK | 1.2 |
| Ex. 2 | 2 | 0.80 | 0.8 | OK | 1.5 |
| Ex. 3 | 3.6 | 0.90 | 0.7 | OK | 1.5 |
| Comp. Ex. 2 | 3.7 | 1.00 | 1.0 | OK | 1.4 |
| Comp. Ex. 3 | 2.1 | 0.10 | 0.9 | OK | 2.3 |
| Ex. 4 | 2.1 | 0.20 | 0.9 | OK | 2.2 |
| Ex. 5 | 2.1 | 1.20 | 0.9 | OK | 1.1 |
| Comp. Ex. 4 | 2.1 | 1.30 | 0.9 | NG | 1.0 |
| Comp. Ex. 5 | 1.8 | 0.70 | 0.5 | NG | 1.0 |
| Ex. 6 | 1.8 | 0.75 | 0.6 | OK | 1.7 |
| Ex. 7 | 1.8 | 0.55 | 1.6 | OK | 2.6 |
| Comp. Ex. 6 | 1.8 | 0.40 | 1.9 | NG | 4.2 |
| Comp. Ex. 7 | 2 | 0.80 | 0.9 | NG | 0.9 |
| Ex. 8 | 2 | 0.75 | 1.0 | OK | 2.2 |
| Comp. Ex. 8 | 2 | 0.80 | 1.1 | NG | 4.2 |

TABLE 1B

| | Vickers Hardness Determination | MTTF [h] | MTTF Determination | Capacitance Change Rate | Capacitance Change Rate Determination | Overall Determination | Manufacturing Method |
|---|---|---|---|---|---|---|---|
| Comp. Ex. 1 | NG | 752 | NG | 11.2 | OK | −21.8% | NG | (1) |
| Ex. 1 | B | 842 | B | 21.8 | OK | −20.1% | B | (1) |
| Ex. 2 | A | 865 | A | 33.6 | OK | −18.6% | AA | (1) |
| Ex. 3 | A | 902 | A | 30.8 | OK | −17.5% | AA | (1) |
| Comp. Ex. 2 | A | 879 | B | 24.7 | NG | −25.1% | NG | (1) |
| Comp. Ex. 3 | A | 883 | B | 20.9 | NG | −24.6% | NG | (1) |
| Ex. 4 | A | 854 | B | 21.9 | OK | −21.6% | A | (1) |
| Ex. 5 | A | 866 | A | 25.5 | OK | −13.5% | A | (1) |
| Comp. Ex. 4 | NG | 754 | NG | 17.9 | OK | −12.8% | NG | (1) |
| Comp. Ex. 5 | NG | 764 | NG | 18.3 | OK | −13.4% | NG | (1) |

TABLE 1B-continued

|  | Vickers Hardness Determination | MTTF Determination | [h] | Capacitance Change Rate Determination | Overall Determination | Manufacturing Method |
|---|---|---|---|---|---|---|
| Ex. 6 | A | 855 | A | 28.0 OK | −17.7% AA | (1) |
| Ex. 7 | A | 883 | B | 21.9 OK | −21.1% A | (1) |
| Comp. Ex. 6 | NG | 782 | NG | 19.6 NG | −25.9% NG | (1) |
| Comp. Ex. 7 | NG | 703 | A | 32.9 OK | −18.0% NG | (2) |
| Ex. 8 | A | 917 | A | 35.1 OK | −19.1% AA | (1) |
| Comp. Ex. 8 | NG | 780 | A | 29.8 OK | −19.1% NG | (3) |

TABLE 2A

|  | $C_{RE}$ [parts by mol] | $C_M$ [parts by mol] | $C_{Si}$ [parts by mol] | $r1 < r2 < r1 \times 4.0$ | $(rb - ra)/L > 0.00008$ and $(rc - rb)/L > 0.00008$ |
|---|---|---|---|---|---|
| Ex. 1 | 0.9 | 0.70 | 0.9 | OK | NG |
| Ex. 9 | 0.9 | 0.70 | 0.9 | OK | OK |
| Ex. 8 | 2 | 0.75 | 1.0 | OK | OK |

TABLE 2B

|  | Vickers Hardness Determination | MTTF[h] Determination | Capacitance Change Rate Determination | Overall Determination | Manufacturing Method |
|---|---|---|---|---|---|
| Ex. 1 | B | 842 B | 21.8 OK | −20.1% B | (1) |
| Ex. 9 | A | 869 A | 27.1 OK | −21.3% AA | (4) |
| Ex. 8 | A | 917 A | 35.1 OK | −19.1% AA | (1) |

TABLE 3A

|  | $C_{RE}$ [parts by mol] | $C_M$ [parts by mol] | $C_{Si}$ [parts by mol] | $r1 < r2 < r1 \times 4.0$ | $SNR > SNRa$ $SNR > SNRb$ and $SNR > SNRc$ |
|---|---|---|---|---|---|
| Ex. 7 | 1.8 | 0.55 | 1.6 | OK | NG |
| Ex. 8 | 2 | 0.75 | 1.0 | OK | OK |
| Comp. Ex. 9 | 2 | 0.75 | 1.0 | NG | NG |

TABLE 3B

|  | Vickers Hardness Determination | MTTF[h] Determination | Capacitance Change Rate Determination | Overall Determination | Manufacturing Method |
|---|---|---|---|---|---|
| Ex. 7 | A | 883 B | 21.9 OK | −21.1% A | (1) |
| Ex. 8 | A | 917 A | 35.1 OK | −19.1% AA | (1) |
| Comp. Ex. 9 | NG | 789 B | 24.1 NG | −23.5% NG | (5) |

TABLE 4A

|  | $C_{RE}$ [parts by mol] | $C_M$ [parts by mol] | $C_S$ [parts by mol] | $r1 < r2 < r1 \times 4.0$ | Area Ratio of RE Solid-Solution Regions in Inner Dielectric Layers | Number Ratio of Specific Core-Shell Main-Phase Particles to Main-Phase Particles |
|---|---|---|---|---|---|---|
| Ex. 1 | 0.9 | 0.70 | 0.9 | OK | 9.8% | 70% |
| Ex. 10 | 1.6 | 0.70 | 0.9 | OK | 18% | 80% |
| Ex. 8 | 2 | 0.75 | 1.0 | OK | 24% | 100% |
| Comp. Ex. 9 | 2 | 0.75 | 1.0 | NG | 54% | 100% |

TABLE 4B

| | Vickers Hardness Determination | MTTF[h] Determination | Capacitance Change Rate Determination | Overall Determination | Manufacturing Method |
|---|---|---|---|---|---|
| Ex. 1 | B | 842 B | 21.8 OK | −20.1% B | (1) |
| Ex. 10 | A | 872 B | 24.4 OK | −17.7% A | (1) |
| Ex. 8 | A | 917 A | 35.1 OK | −19.1% AA | (1) |
| Comp. Ex. 9 | NG | 789 B | 24.1 NG | −23.5% NG | (5) |

TABLE 5A

| | $C_{RE}$ [parts by mol] | $C_M$ [parts by mol] | $C_S$ [parts by mol] | r1 < r2 < r1 × 4.0 | Type of M1 | $C_{M1}$ [parts by mol] |
|---|---|---|---|---|---|---|
| Ex. 8 | 2 | 0.75 | 1.0 | OK | Mg | 0.40 |
| Ex. 11 | 2 | 0.75 | 1.0 | OK | Mg | 0.30 |
| Ex. 5 | 2.1 | 1.20 | 0.9 | OK | Mn | 0.60 |
| Ex. 12 | 2.1 | 1.20 | 0.9 | OK | Mn | 0.95 |

TABLE 5B

| | Vickers Hardness Determination | MTTF[h] Determination | Capacitance Change Rate Determination | Overall Determination | Manufacturing Method |
|---|---|---|---|---|---|
| Ex. 8 | A | 917 A | 35.1 OK | −19.1% AA | (1) |
| Ex. 11 | A | 853 B | 19.7 OK | 21.1% A | (1) |
| Ex. 5 | A | 866 A | 25.5 OK | −13.5% AA | (1) |
| Ex. 12 | B | 808 B | 20.4 OK | −21.7% B | (1) |

TABLE 6A

| | $C_{RE}$ [parts by mol] | $C_M$ [parts by mol] | $C_{Si}$ [parts by mol] | r1 < r2 < r1 × 4.0 | r1 [nm] |
|---|---|---|---|---|---|
| Ex. 8 | 2 | 0.75 | 1.0 | OK | 210.0 |
| Ex. 13 | 2 | 0.75 | 1.0 | OK | 180.0 |
| Ex. 14 | 2 | 0.75 | 1.0 | OK | 250.0 |

TABLE 6B

| | Vickers Hardness Determination | MTTF[h] Determination | Capacitance Change Rate Determination | Overall Determination | Manufacturing Method |
|---|---|---|---|---|---|
| Ex. 8 | A | 917 A | 35.1 OK | −19.1% AA | (1) |
| Ex. 13 | B | 829 B | 23.6 OK | −13.8% B | (6) |
| Ex. 14 | B | 809 B | 20.4 OK | −15.0% B | (7) |

The results of Table 1A and Table 1B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, and r1 and r2 satisfied the relation of r1<r2<r1× 4.0 (Example 1 to Example 8), the Vickers hardness was high, the MTTF was long, and the capacitance change rate was favorable.

Note that, in Comparative Example 7, since the Ba/Ti ratio of the raw material powder of the main component of the exterior regions was 1.02, the grain growth of the main-phase particles was excessively restrained in both of the interior region and the exterior regions. In particular, since the grain growth of the main-phase particles in the exterior regions, where heat conduction by the inner electrode layers was not very expected, was remarkably restrained, r1 and r2 did not satisfy the relation of r1<r2<r1× 4.0.

Note that, in Comparative Example 8, since the average particle size of the raw material powder of the main component of the exterior regions was 100 nm, the main-phase particles in the exterior regions had a smaller average particle size and a higher reactivity compared to those in the interior region, the grain growth of the main-phase particles in the exterior regions was excessive, r2 was larger than r1×4.0, and r1 and r2 did not thus satisfy the relation of r1<r2<r1×4.0.

The results of Table 2A and Table 2B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, r1 and r2 satisfied the relation of r1<r2<r1×4.0, and the relations of (rb−ra)/L>0.00008 and (rc−rb)/L>0.00008 were satisfied (Example 9 and Example 8), the Vickers hardness was higher, and the MTTF was longer, compared to those when the relations of (rb−ra)/L>0.00008 and (rc−rb)/L>0.00008 were not satisfied (Example 1).

In Example 9, since the oxygen partial pressure during firing was lower than that in Example 1, the solid solution of RE into the main-phase particles was easy to progress, the concentration of RE in the grain boundaries decreased, the grain growth of the main-phase particles constituting the outer dielectric layers was consequently promoted to some extent, and the Vickers hardness was further improved. Moreover, in Example 9, since the solid solution amount of subcomponents into the main-phase particles was within a more appropriate range compared to that in Example 1, the MTTF was longer.

Figure 5:
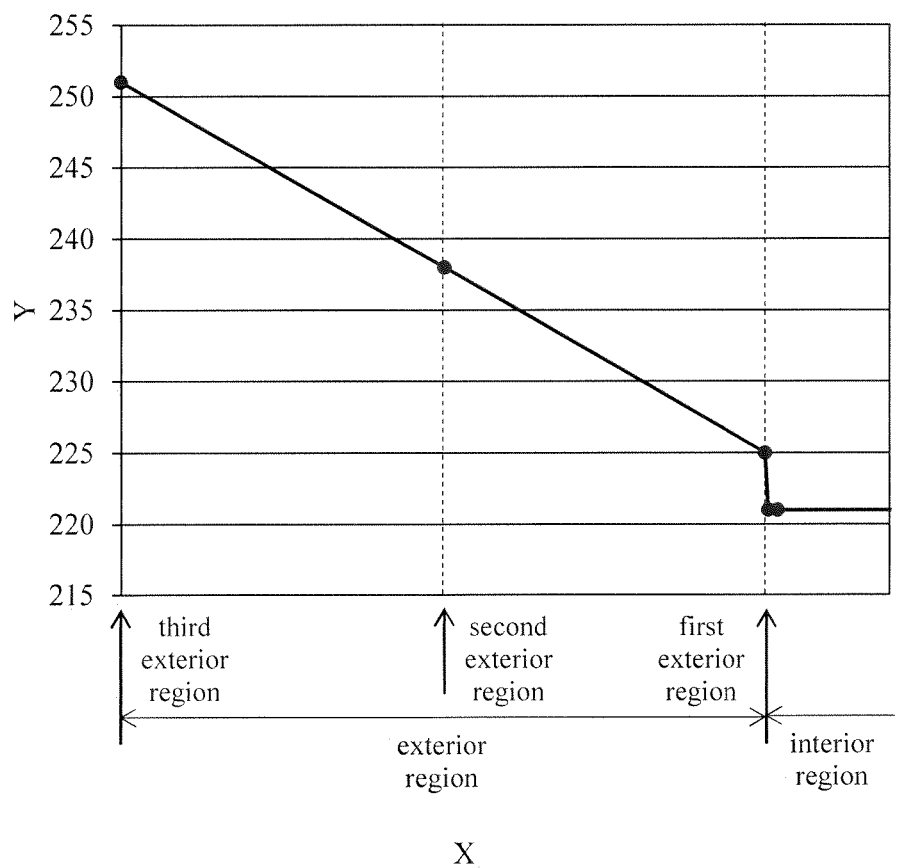
FIG. 5 is a graph relating to Example 9.

The graph relating to Example 9 is shown in FIG. 5.

In FIG. 5, the X-axis indicates a distance from the outer surface of the element body, and the Y-axis indicates an average particle size of the main-phase particles (unit: nm).

The results of FIG. 5 confirmed that, in Example 9, the average particle sizes of the main-phase particles in the exterior regions were obviously larger than the average particle size of the main-phase particles in the interior region.

The results of Table 3A and Table 3B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, r1 and r2 satisfied the relation of r1<r2<r1×4, and the relations of SNR>SNRa, SNR>SNRb, and SNR>SNRc were satisfied (Example 8), the Vickers hardness was higher, the MTTF was longer, the capacitance change rate was more favorable, compared to those when the relations of SNR>SNRa, SNR>SNRb, and SNR>SNRc were not satisfied (Example 7).

When the relations of SNR>SNRa, SNR>SNRb, and SNR>SNRc were satisfied (Example 8), since the variation in the average particle size of the main-phase particles in the interior region was smaller than that in the average particle size of the main-phase particles in the exterior regions as compared to when the relations of NR>SNRa, SNR>SNRb, and SNR>SNRc were not satisfied (Example 7), the variation in the number of interlayer particles, namely, the number of particles in the inner dielectric layers interposed between the internal electrode layers was small, and the MTTF and the capacitance change rate were thereby favorable.

Note that, in Comparative Example 9, since the average particle size of the $BaTiO_3$ powder, which was the raw material powder of the inner dielectric layers, was 120 nm, the particle size of the main component in the interior region was small, and r1<r2<r1×4.0 was not satisfied. Note that, in Comparative Example 9, since the average particle size of the $BaTiO_3$ powder, which was the raw material powder of the inner dielectric layers, was small, the grain growth rate, which was represented by a ratio of a particle size after firing to a raw material particle size (a particle size after firing/a raw material particle size), was large, the subcomponents were thereby excessively solid-soluted into the main component, and the capacitance change rate was worsened.

The results of Table 4A and Table 4B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, r1 and r2 satisfied the relation of r1<r2<r1×4.0, and the RE solid solution area ratio was 12% or more and 50% or less (Example 10 and Example 8), the Vickers hardness was higher, the MTTF was longer, the capacitance change rate was more favorable, compared to those when the RE solid solution area ratio was 9.8% (Example 1).

When the RE solid solution area ratio was 12% or more and 50% or less (Example 10 and Example 8), since the solid solution area of RE with respect to the main-phase particles was larger than that when the RE solid solution area ratio was 9.8% (Example 1), the resistance was high, the movement of oxygen defects was restrained under high temperature and high voltage conditions, and the MTTF was thereby improved.

The results of Table 4A and Table 4B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, r1 and r2 satisfied the relation of r1<r2<r1×4.0, and the number ratio of the specific main-phase particles to the main-phase particles was 90% or more (Example 8), the Vickers hardness was higher, and the MTTF was longer, than those when the number ratio of the specific main-phase particles to the main-phase particles was 80% (Example 10).

When the number ratio of the specific main-phase particles to the main-phase particles was 90% or more (Example 8), since the number ratio of the specific main-phase particles to the main-phase particles was higher than that when the number ratio of the specific main-phase particles to the main-phase particles was 80% (Example the specific main phase particles were present throughout the sample, the variation was small in the structure of the main-phase particles in the sample, and the Vickers hardness was thus higher. Moreover, it is considered that since the electric current density was prevented from being locally high under a high electric field, the MTTF was further improved.

The results of Table 5A and Table 5B confirmed that when $C_{RE}$ was 0.90 parts by mol or more and 3.60 parts by mol or less, $C_M$ was 0.20 parts by mol or more and 1.20 parts by mol or less, $C_{Si}$ was 0.60 parts by mol or more and 1.80 parts by mol or less, r1 and r2 satisfied the relation of r1<r2<r1×4.0, and $C_{M1}$ was 0.40 parts by mol or more and 0.90 parts by mol or less (Example 8 and Example 5), the Vickers hardness was higher, and the MTTF was longer, and the capacitance change rate was more favorable, than those when $C_{M1}$ was 0.30 parts by mol (Example 11) or $C_{M1}$ was 0.95 parts by mol (Example 12).

When $C_{M1}$ was 0.40 parts by mol or more and 0.90 parts by mol or less (Example 8 and Example 5), since the grain boundary component was sufficiently secured compared to when $C_{M1}$ was 0.30 parts by mol (Example 11), it was possible to prevent abnormal grain growth and particle size variation of the main-phase particles, and the MTTF was thereby further improved.

When $C_{M1}$ was 0.40 parts by mol or more and 0.90 parts by mol or less (Example 8 and Example 5), since the ratio of the acceptor component to the donor component was within an appropriate range compared to that when $C_{M1}$ was 0.95 parts by mol (Example 12), the generation of oxygen defects was prevented, and the MTTF was thereby improved. Moreover, since the grain boundary component was not too much, the grain growth of the main-phase particles in the exterior regions progressed, and the Vickers hardness was thereby higher.

The results of Table 6A and Table 6B confirmed that when r1 satisfied the relation of 180 nm<r1<240 nm (Example 8), the Vickers hardness was higher, and the MTTF was longer, than those when r1 was 180.0 nm (Example 13) or when r1 was 250.0 nm (Example 14).

When r1 satisfied the relation of 180 nm<r1<240 nm (Example 8), since the number of interlayer particles, namely, the number of particles in the inner dielectric layers interposed between the internal electrode layers was larger than that when r1 was 250.0 nm (Example 14), the MTTF was longer.

When r1 satisfied the relation of 180 nm<r1<240 nm (Example 8), since the subcomponents were sufficiently solid-soluted into the main-phase particles compared to when r1 was 180.0 nm (Example 13), the MTTF was longer.

DESCRIPTION OF THE REFERENCE NUMERICAL

2 . . . multilayer ceramic capacitor
4 . . . element body 40 outer surface of element body
13 . . . interior region
10 . . . inner dielectric layer
20 . . . main-phase particle
21 . . . grain boundary
22 . . . core-shell main-phase particle
22a . . . core portion
22b . . . shell portion
24 . . . complete solid-solution main-phase particle
12 . . . internal electrode layer
120 . . . outer surface of internal electrode layer
15 . . . exterior region
15a . . . first exterior region
15b . . . second exterior region
15c . . . third exterior region
11 . . . outer dielectric layer
6 . . . external electrode

What is claimed is:

1. A multilayer electronic device comprising:
an element body including:
  an interior region in which inner dielectric layers and internal electrode layers are alternately laminated; and
  an exterior region located outside the interior region in its lamination direction; and
a pair of external electrodes existing on surfaces of the element body to connect with the internal electrode layers
wherein
main-phase particles in the inner dielectric layers and outer dielectric layers of the exterior region include a main component having a perovskite crystal structure represented by a general formula of $ABO_3$, in which
  A is at least one selected from Ba, Sr, and Ca, and
  B is at least one selected from Ti, Zr, and Hf,
the inner dielectric layers and the outer dielectric layers include subcomponents containing RE, M, and Si, in which
  RE is at least one selected from Yb, Y, Ho, Dy, Tb, Gd, and Eu, and
  M is at least two selected from Mg, Mn, V, and Cr,
an RE content $C_{RE}$ in terms of $RE_2O_3$ is 0.90 parts by mol or more and 3.60 parts by mol or less with respect to 100 parts by mol of the main component in the inner dielectric layers and the outer dielectric layers,
an M content $C_M$ in terms of MO is 0.20 parts by mol or more and 1.20 parts by mol or less with respect to 100 parts by mol of the main component in the inner dielectric layers and the outer dielectric layers,
a Si content $C_{Si}$ in terms of $SiO_2$ is 0.60 parts by mol or more and 1.80 parts by mol or less with respect to 100 parts by mol of the main component in the inner dielectric layers and the outer dielectric layers, and
r1 and r2 satisfy a relation of r1<r2<r1×4.0, in which
  r1 is an average particle size of the main-phase particles constituting the inner dielectric layers, and
  r2 is an average particle size of the main-phase particles constituting the outer dielectric layers,
and wherein L, ra, rb, and rc satisfy relations of (rb−ra)/L>0.00008 and (rc−rb)/L>0.00008, in which
2×L is a distance from an outer surface of an outermost layer of the internal electrode layers to an outer surface of the element body,
ra is an average particle size of the main-phase particles in the exterior region near the internal electrode layers,
rb is an average particle size of the main-phase particles in the exterior region at an intermediate point between the outer surface of the outermost layer of the internal electrode layers and the outer surface of the element body, and
rc is an average particle size of the main-phase particles in the exterior region near the outer surface of the element body.

2. The multilayer electronic device according to claim 1, wherein SNR, SNRa, SNRb, and SNRc satisfy relations of SNR>SNRa, SNR>SNRb, and SNR>SNRc, in which
  SNR is a SN ratio of particle sizes of the main-phase particles constituting the inner dielectric layers,
  SNRa is a SN ratio of particle sizes of the main-phase particles in the exterior region near the internal electrode layers,
  SNRb is a SN ratio of particle sizes of the main-phase particles in the exterior region at an intermediate point between an outer surface of an outermost layer of the internal electrode layers and an outer surface of the element body, and
  SNRc is a SN ratio of particle sizes of the main-phase particles in the exterior region near the outer surface of the element body.

3. The multilayer electronic device according to claim 1, wherein an area ratio of a solid-solution region of RE of the main-phase particles constituting the inner dielectric layers is 12% or more and 50% or less.

4. The multilayer electronic device according to claim 1, wherein
at least a part of the main-phase particles constituting the inner dielectric layers has a core-shell structure including:
  a core portion; and
  a shell portion surrounding the core portion and containing RE in solid solution,
the main-phase particles constituting the inner dielectric layers and having an average thickness of 5 nm or more in the shell portion are defined as specific main-phase particles, and
a number ratio of the specific main-phase particles to the main-phase particles in the inner dielectric layers is 90% or more.

5. The multilayer electronic device according to claim 1, wherein
  M1 is an element of M with the highest content in the inner dielectric layers and the outer dielectric layers, and
  a M1 content $C_{M1}$ in terms of M1O is 0.40 parts by mol or more and 0.90 parts by mol or less with respect to 100 parts by mol of the main component in the inner dielectric layers and the outer dielectric layers.

6. The multilayer electronic device according to claim 1, wherein a relation of 180 nm<r1<240 nm is satisfied,
  in which r1 is an average particle size of the main-phase particles constituting the inner dielectric layers.

7. A multilayer electronic device comprising:
an element body including:
  an interior region in which inner dielectric layers and internal electrode layers are alternately laminated; and
  an exterior region located outside the interior region in its lamination direction; and
a pair of external electrodes existing on surfaces of the element body to connect with the internal electrode layers
wherein
main-phase particles in the inner dielectric layers and outer dielectric layers of the exterior region include a main component having a perovskite crystal structure represented by a general formula of $ABO_3$, in which
A is at least one selected from Ba, Sr, and Ca, and
B is at least one selected from Ti, Zr, and Hf,
the inner dielectric layers and the outer dielectric layers include subcomponents containing RE, M, and Si, in which
RE is at least one selected from Yb, Y, Ho, Dy, Tb, Gd, and Eu, and
M is at least two selected from Mg, Mn, V, and Cr,
an RE content $C_{RE}$ in terms of $RE_2O_3$ is 0.90 parts by mol or more and 3.60 parts by mol or less with respect to 100 parts by mol of the main component in the inner dielectric layers and the outer dielectric layers,
an M content $C_M$ in terms of MO is 0.20 parts by mol or more and 1.20 parts by mol or less with respect to 100 parts by mol of the main component in the inner dielectric layers and the outer dielectric layers,
a Si content $C_{Si}$ in terms of $SiO_2$ is 0.60 parts by mol or more and 1.80 parts by mol or less with respect to 100 parts by mol of the main component in the inner dielectric layers and the outer dielectric layers, and
r1 and r2 satisfy a relation of r1<r2<r1×4.0, in which
r1 is an average particle size of the main-phase particles constituting the inner dielectric layers, and
r2 is an average particle size of the main-phase particles constituting the outer dielectric layers,
and wherein SNR, SNRa, SNRb, and SNRc satisfy relations of SNR>SNRa, SNR>SNRb, and SNR>SNRc, in which
SNR is a SN ratio of particle sizes of the main-phase particles constituting the inner dielectric layers,
SNRa is a SN ratio of particle sizes of the main-phase particles in the exterior region near the internal electrode layers,
SNRb is a SN ratio of particle sizes of the main-phase particles in the exterior region at an intermediate point between an outer surface of an outermost layer of the internal electrode layers and an outer surface of the element body, and
SNRc is a SN ratio of particle sizes of the main-phase particles in the exterior region near the outer surface of the element body.

8. A multilayer electronic device comprising:
an element body including:
an interior region in which inner dielectric layers and internal electrode layers are alternately laminated; and
an exterior region located outside the interior region in its lamination direction; and
a pair of external electrodes existing on surfaces of the element body to connect with the internal electrode layers
wherein
main-phase particles in the inner dielectric layers and outer dielectric layers of the exterior region include a main component having a perovskite crystal structure represented by a general formula of $ABO_3$, in which
A is at least one selected from Ba, Sr, and Ca, and
B is at least one selected from Ti, Zr, and Hf,
the inner dielectric layers and the outer dielectric layers include subcomponents containing RE, M, and Si, in which
RE is at least one selected from Yb, Y, Ho, Dy, Tb, Gd, and Eu, and
M is at least two selected from Mg, Mn, V, and Cr,
an RE content $C_{RE}$ in terms of $RE_2O_3$ is 0.90 parts by mol or more and 3.60 parts by mol or less with respect to 100 parts by mol of the main component in the inner dielectric layers and the outer dielectric layers,
an M content $C_M$ in terms of MO is 0.20 parts by mol or more and 1.20 parts by mol or less with respect to 100 parts by mol of the main component in the inner dielectric layers and the outer dielectric layers,
a Si content $C_{Si}$ in terms of $SiO_2$ is 0.60 parts by mol or more and 1.80 parts by mol or less with respect to 100 parts by mol of the main component in the inner dielectric layers and the outer dielectric layers, and
r1 and r2 satisfy a relation of r1<r2<r1×4.0, in which
r1 is an average particle size of the main-phase particles constituting the inner dielectric layers, and
r2 is an average particle size of the main-phase particles constituting the outer dielectric layers, and
wherein an area ratio of a solid-solution region of RE of the main-phase particles constituting the inner dielectric layers is 12% or more and 50% or less.

* * * * *